United States Patent
Zhu et al.

(10) Patent No.: US 11,863,715 B2
(45) Date of Patent: Jan. 2, 2024

(54) JOINT USE OF ADAPTIVE COLOUR TRANSFORM AND DIFFERENTIAL CODING OF VIDEO

(71) Applicants: Beijing Bytedance Network Technology Co., Ltd., Beijing (CN); Bytedance Inc., Los Angeles, CA (US)

(72) Inventors: Weijia Zhu, San Diego, CA (US); Jizheng Xu, San Diego, CA (US); Li Zhang, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/842,025

(22) Filed: Jun. 16, 2022

(65) Prior Publication Data
US 2022/0321916 A1    Oct. 6, 2022

Related U.S. Application Data

(63) Continuation of application No. PCT/CN2020/137941, filed on Dec. 21, 2020.

(30) Foreign Application Priority Data
Dec. 19, 2019    (WO) ............... PCT/CN2019/126472

(51) Int. Cl.
*H04N 19/60*    (2014.01)
*H04N 19/105*    (2014.01)
(Continued)

(52) U.S. Cl.
CPC ........... *H04N 19/60* (2014.11); *H04N 19/105* (2014.11); *H04N 19/176* (2014.11); *H04N 19/186* (2014.11)

(58) Field of Classification Search
None
See application file for complete search history.

(56) References Cited

U.S. PATENT DOCUMENTS

| 6,016,163 A | 1/2000 | Rodriguez et al. |
| 6,833,993 B2 | 12/2004 | Wang et al. |

(Continued)

FOREIGN PATENT DOCUMENTS

| CN | 104205836 A | 12/2014 |
| CN | 104221378 A | 12/2014 |

(Continued)

OTHER PUBLICATIONS

Chen et al., "Algorithm description for Versatile Video Coding and Test Model 7 (VTM 7)," JVET-P2002-v1, 16th Meeting: Geneva, CH, Oct. 2019.*

(Continued)

*Primary Examiner* — Michael J Hess
(74) *Attorney, Agent, or Firm* — Perkins Coie LLP

(57) ABSTRACT

Methods, systems and devices for implementing adaptive color transform (ACT) and block based delta pulse code modulation (BDPCM) during image/video encoding or decoding are described. An example method of video processing includes determining, for a conversion between a current video unit of a video that is a chroma video unit and a bitstream representation of the video, whether a block-based delta pulse code modulation (BDPCM) mode is available based on a rule, and performing the conversion based on the determining, wherein the rule is based on whether an adaptive color transform (ACT) mode is used for coding the current video unit and/or whether the BDPCM mode is used for coding a luma video unit corresponding to the current video unit.

15 Claims, 12 Drawing Sheets

(51) Int. Cl.
  *H04N 19/176* (2014.01)
  *H04N 19/186* (2014.01)

(56) References Cited

U.S. PATENT DOCUMENTS

| | | | |
|---|---|---|---|
| 7,843,414 | B2 | 11/2010 | Hsu et al. |
| D661,490 | S | 6/2012 | Jin et al. |
| 8,211,570 | B2 | 7/2012 | He et al. |
| 8,252,463 | B2 | 8/2012 | He et al. |
| 8,306,124 | B2 | 11/2012 | Gao et al. |
| 8,817,208 | B2 | 8/2014 | Li et al. |
| 9,229,877 | B2 | 1/2016 | Bivens et al. |
| 9,591,302 | B2 | 3/2017 | Sullivan |
| 9,734,026 | B2 | 8/2017 | Hack et al. |
| 10,095,698 | B2 | 10/2018 | Cullen et al. |
| 10,319,100 | B2 | 6/2019 | Dai et al. |
| 2002/0106025 | A1 | 8/2002 | Tsukagoshi et al. |
| 2007/0098799 | A1 | 5/2007 | Zhang et al. |
| 2007/0162591 | A1 | 7/2007 | Mo et al. |
| 2009/0262798 | A1 | 10/2009 | Chiu et al. |
| 2015/0264354 | A1 | 9/2015 | Zhang et al. |
| 2015/0264374 | A1 | 9/2015 | Xiu et al. |
| 2016/0100175 | A1* | 4/2016 | Laroche ............... H04N 19/192 375/240.18 |
| 2016/0227224 | A1 | 8/2016 | Hsieh et al. |
| 2016/0261864 | A1 | 9/2016 | Samuelsson et al. |
| 2016/0286235 | A1 | 9/2016 | Yamamoto et al. |
| 2017/0034532 | A1 | 2/2017 | Yamamoto et al. |
| 2017/0150157 | A1 | 5/2017 | Yamori |
| 2018/0027246 | A1 | 1/2018 | Liu et al. |
| 2018/0048901 | A1 | 2/2018 | Zhang et al. |
| 2018/0084284 | A1 | 3/2018 | Rosewarne et al. |
| 2018/0109794 | A1 | 4/2018 | Wang et al. |
| 2018/0373710 | A1 | 12/2018 | Cullen et al. |
| 2019/0089984 | A1 | 3/2019 | He |
| 2019/0158831 | A1 | 3/2019 | Jung et al. |
| 2019/0208206 | A1* | 7/2019 | Nakagami ............ H04N 19/176 |
| 2019/0289320 | A1 | 9/2019 | Chuang et al. |
| 2020/0236381 | A1* | 7/2020 | Chujoh ................ H04N 19/186 |
| 2021/0044820 | A1 | 2/2021 | Furht et al. |
| 2021/0099727 | A1 | 4/2021 | Deng et al. |
| 2021/0266556 | A1 | 8/2021 | Choi et al. |
| 2021/0344903 | A1 | 11/2021 | Yu et al. |
| 2022/0295091 | A1 | 9/2022 | Chujoh et al. |
| 2022/0337836 | A1 | 10/2022 | Zhao et al. |
| 2022/0345726 | A1 | 10/2022 | Zhao et al. |
| 2023/0007255 | A1* | 1/2023 | Tsukuba ................. H04N 19/60 |

FOREIGN PATENT DOCUMENTS

| | | |
|---|---|---|
| CN | 104584559 A | 4/2015 |
| CN | 105960802 A | 9/2016 |
| CN | 105979271 A | 9/2016 |
| CN | 106797465 A | 5/2017 |
| CN | 107079150 A | 8/2017 |
| CN | 107079157 A | 8/2017 |
| CN | 107211122 A | 9/2017 |
| CN | 107409215 A | 11/2017 |
| CN | 107431826 A | 12/2017 |
| CN | 107534782 A | 1/2018 |
| CN | 107846591 A | 3/2018 |
| CN | 110121884 A | 8/2019 |
| EP | 3425911 A1 | 1/2019 |
| JP | 2022542851 A | 10/2022 |
| JP | 2023011955 A | 1/2023 |
| JP | 2023500644 A | 1/2023 |
| WO | 2008016219 A1 | 2/2008 |
| WO | 2012117744 A1 | 9/2012 |
| WO | 2012177202 A1 | 12/2012 |
| WO | 2015015058 A1 | 2/2015 |
| WO | 2016049894 A1 | 4/2016 |
| WO | 2016123232 A1 | 8/2016 |

OTHER PUBLICATIONS

Bross et al., "Versatile Video Coding (Draft 7)," JVET-P2001, 16th Meeting: Geneva, CH, Oct. 2019.*

Jung et al., "On QP adjustment in adaptive color transform," JVET-Q0241-v3, 17th Meeting: Brussels, Jan. 2020.*

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.

Bross et al. "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2001, 2019.http://phenix.it-sudparis.eu/jvet/doc_end_user/documents/16_Geneva/wg11/JVET-P2001-v14.zip.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "Algorithm Description for Versatile Video Coding and Test Model 7 (VTM 7)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2002, 2019.

Clare et al. "CE8-related: BDPCM for Chroma," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0166, 2019.

Dou et al. "Disallowing JCCR Mode for ACT Coded CUs," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0305, 2020.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

Kotra et al. "Non-CE5: Chroma QP Derivation Fix for Deblocking Filter (Combination of JVET-P0105 and JVET-P0539)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P1001, 2019.

Li et al. "Fix of Initial QP Signaling," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0553, 2018.

Li et al. "Interaction Between ACT and BDPCM Chroma," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0423, 2020.

McCarthy et al. "AHG9: Modification of General Constraint Information," Joint Video Experts Team (JVET) of ITU-T SG 16 WP 3 and ISO/IEC JTC 1/SC 29/WG 11 19th Meeting: by teleconference, Jun. 22-Jul. 1, 2020, document JVET-S0105, 2020.

Rosewarne et al. "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG1125th Meeting: Chengdu, CN, Oct. 14-21, 2016, document JCTVC-Y1002, 2016.

Said et al. "CE5: Per-Context CABAC Initialization with Single Window (Test 5.1.4)," Joint Video Experts Team (JVET) of ITU-T SG 16 WP 3 and ISO/IEC JTC 1/SC 29/WG 1 13th Meeting: Marrakech, MA, Jan. 9-18, 2019, document JVET-M0413, 2019.

Wang et al. "AHG2: Editorial Input on VVC Draft Text," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0041, 2020.

Wang et al. "AHG9: Cleanups on Signaling for CC-ALF, BDPCM, ACT and Palette," Joint Video Experts Team (JVET)of ITU-T SG 16 WP 3 and ISO/IEC JTC 1/SC 29/WG 1117th Meeting: Brussels, BE, Jan. 7-17, 2020, document JVET-Q0520, 2020.

Wang et al. "AHG8/AHG9/AHG12: On the Combination of RPR, Subpictures, and Scalability," Joint Video Experts Team (JVET) of

(56) References Cited

OTHER PUBLICATIONS

ITU-T SG 16 WP 3 and ISO/IEC JTC 1/SC 29/WG 11 18th Meeting: by teleconference, Apr. 15-24, 2020, document JVET-R0058, 2020.
Xiu et al. "Support of Adaptive Color Transform for 444 Video Coding in VVC," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0517, 2019.
Xiu et al. "AHG16: Clipping Residual Samples for ACT," Joint Video Experts Team (JVET) of ITU-T SG 16 WP 3 an ISO/IEC JTC 1/SC 29/WG 1117th Meeting: Brussels, BE, Jan. 7-17, 2020, document JVET-Q0513, 2020.
Zhang et al. "AHG12: Signaling of Chroma Presence in PPS and APS," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0420, 2020.
Zhang et al. "BoG on ACT," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0815, 2020.
Zhao et al. "An Implementation of Adaptive Color Transform in VVC," Joint Video Experts Team (JVET) of ITU-T SG 16 WP 3 and ISO/IEC JTC 1/SC 29/WG 11 14th Meeting: Geneva, CH, Mar. 19-27, 2019, JVET-N0368, 2019.
Zhao et al. "AHG15: On CU Adaptive Chroma QP Offset Signalling," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0436, 2019.
Zhu et al. "Alignment of BDPCM for ACT," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0521, 2020.
Zhu et al. "ACT: Common Text for Bug Fixes and Transform Change," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q0820, 2020.
https://vcgit.hhi.fraunhofer.de/jvet/VVCSoftware_VTM/-/tags/VTM-7.0.
JEM-7.0: https://jvet.hhi.fraunhofer.de/svn/svn_HMJEMSoftware/tags/ HM-16.6-JEM-7.0.
International Search Report and Written Opinion from International Patent Application No. PCT/CN2020/137941 dated Mar. 22, 2021 (10 pages).
International Search Report and Written Opinion from International Patent Application No. PCT/CN2020/137946 dated Mar. 22, 2021 (9 pages).
International Search Report and Written Opinion from International Patent Application No. PCT/CN2021/070265 dated Mar. 26, 2021 (14 pages).
International Search Report and Written Opinion from International Patent Application No. PCT/CN2021/070279 dated Apr. 1, 2021 (11 pages).
International Search Report and Written Opinion from International Patent Application No. PCT/CN2021/070282 dated Mar. 23, 2021 (13 pages).
International Search Report and Written Opinion from International Patent Application No. PCT/CN2021/070580 dated Mar. 22, 2021 (12 pages).
International Search Report and Written Opinion from International Patent Application No. PCT/CN2021/071659 dated Apr. 6, 2021 (14 pages).
International Search Report and Written Opinion from International Patent Application No. PCT/CN2021/071660 dated Mar. 31, 2021 (11 pages).
International Search Report and Written Opinion from International Patent Application No. PCT/CN2021/072017 dated Apr. 19, 2021 (14 pages).
International Search Report and Written Opinion from International Patent Application No. PCT/CN2021/072396 dated Mar. 29, 2021 (14 pages).
Chang et al. "AhG9: On General Constraint Information Syntax," Joint Video Experts Team (JVET) of ITU-T SG 16 WP 3 and ISO/IEC JTC 1/SC 29/WG 11 18th Meeting, by teleconference, Apr. 15-24, 2020, document JVET-R0286, 2020.
Wang, Ye-Kui. "AHG9: A Few More General Constraints Flags," Joint Video Experts Team (JVET) of ITU-T SG 16 WP 3 and ISO/IEC JTC 1/SC 29/WG 11 17th Meeting, Brussels, BE, Jan. 7-17, 2020, document JVET-Q0114, 2020.
Extended European Search Report from European Patent Application No. 21736195.5 dated Mar. 15, 2023 (14 pages).
Notice of Allowance from U.S. Appl. No. 17/857,874 dated Jan. 26, 2023.
Non-Final Office Action from U.S. Appl. No. 17/857,924 dated Feb. 3, 2023.
Notice of Allowance from U.S. Appl. No. 17/857,874 dated Jul. 6, 2023.

\* cited by examiner

JOINT USE OF ADAPTIVE COLOUR TRANSFORM AND DIFFERENTIAL CODING OF VIDEO

CROSS-REFERENCE TO RELATED APPLICATION

This application is a continuation of International Patent Application No. PCT/CN2020/137941, filed on Dec. 21, 2020, which claims the priority to and benefits of International Patent Application No. PCT/CN2019/126472 filed on Dec. 19, 2019. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders to perform adaptive color transform (ACT) and block based delta pulse code modulation (BDPCM) during image/video encoding or decoding.

In an example aspect, a method of video processing is disclosed. The method includes performing a conversion between a video comprising a current video unit and a bitstream representation of the video according to a rule, wherein the rule specifies that an adaptive color transform (ACT) mode and a block-based delta pulse code modulation (BDPCM) mode are available for coding the current video unit in a mutually exclusive manner.

In another example aspect, a method of video processing is disclosed. The method includes determining, for a conversion between a current video unit of a video that is a chroma video unit and a bitstream representation of the video, whether a block-based delta pulse code modulation (BDPCM) mode is available based on a rule, and performing the conversion based on the determining, wherein the rule is based on whether an adaptive color transform (ACT) mode is used for coding the current video unit and/or whether the BDPCM mode is used for coding a luma video unit corresponding to the current video unit.

In yet another example aspect, a method of video processing is disclosed. The method includes performing a conversion between a video comprising a current video unit that is a chroma video unit and a bitstream representation of the video, wherein the current video unit is coded using an adaptive color transform (ACT) mode and a block-based delta pulse code modulation (BDPCM) mode, wherein the bitstream representation conforms to a format rule, wherein the format rule specifies that an indication of a BDPCM prediction direction of a chroma component of the current video unit is determined by a BDPCM prediction direction of a corresponding luma video unit coded in the BDPCM mode, and wherein a signaling of the indication is not present in the bitstream representation.

In yet another example aspect, a method of video processing is disclosed. The method includes performing a conversion between a video comprising a current video unit and a bitstream representation of the video according to a rule, wherein, the rule specifies that during encoding, an adaptive color transform (ACT) mode is applied to the current video unit after a block-based delta pulse code modulation (BDPCM) mode is applied to the current video unit, or during decoding, the ACT mode is applied to the current video unit prior to the BDPCM mode applied to the current video unit.

In yet another example aspect, a method of video processing is disclosed. The method includes determining, for a conversion between a video comprising a current video unit and a bitstream representation of the video, that an adaptive color transform (ACT) mode is enabled for the conversion, and performing, based on the determining, the conversion by performing a clipping operation on a quantization parameter (QP) associated with the current video unit.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a non-transitory computer readable medium having code stored thereon is disclose. The code embodies one of the methods described herein in the form of processor-executable code.

These, and other, features are described throughout the present document.

DETAILED DESCRIPTION

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. INTRODUCTION

This patent document is related to image/video coding technologies. Specifically, it is related to adaptive color transform in image/video coding. It may be applied to the standard under development, e.g. Versatile Video Coding. It may be also applicable to future video coding standards or video codec.

2. BRIEF DESCRIPTION OF VIDEO CODING

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 7) could be found at: http://phenix.it-sudparis.eu/jvet/doc_end_user/documents/16_Geneva/wg11/JVET-P2001-v14.zip The latest reference software of VVC, named VTM, could be found at: https://vcgit.hhi.fraunhofer.de/jvet/VVCSoftware_VTM/tags/VTM-7.0

2.1. Adaptive Color Transform (ACT) in HEVC-SCC

Figure 1:
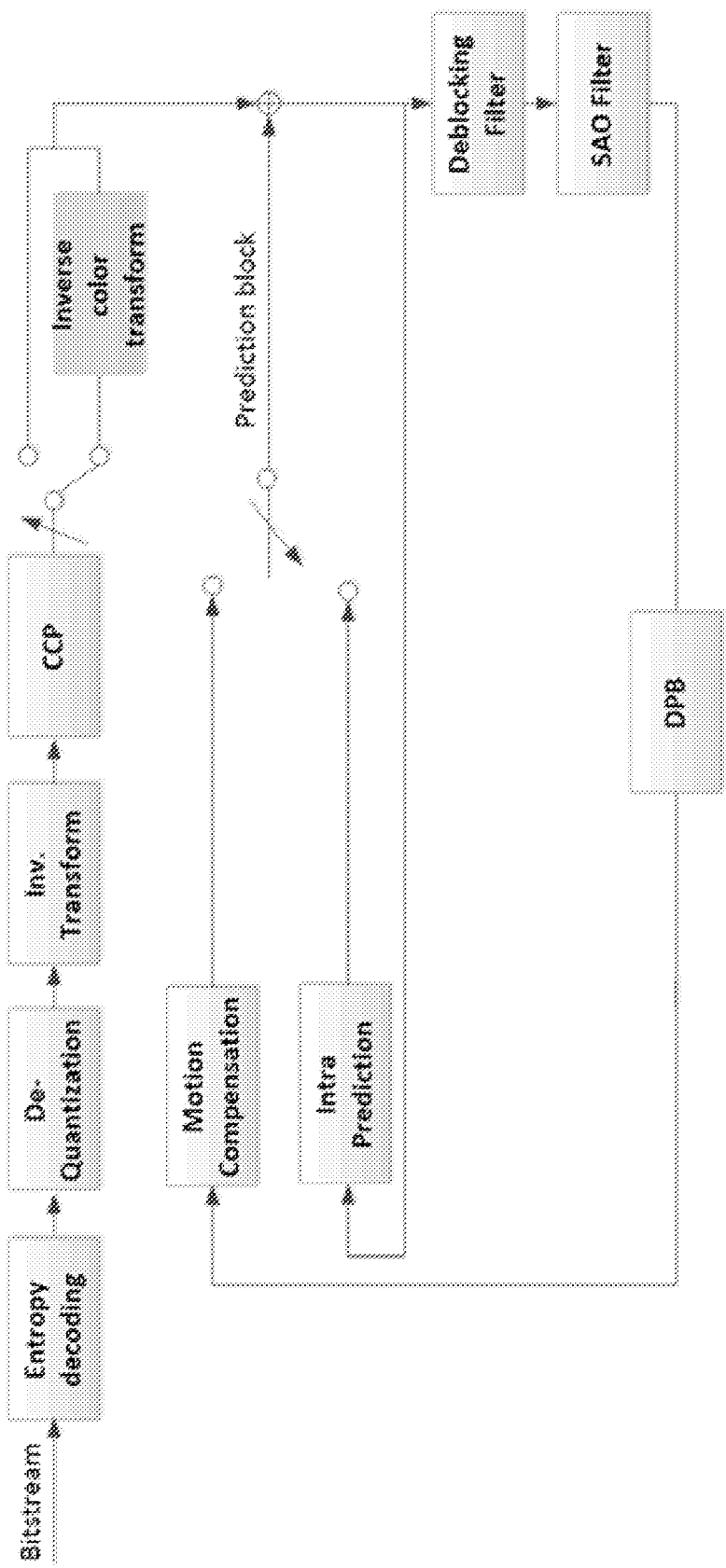
FIG. 1 shows an example screen content coding (SCC) decoder flow of in-loop adaptive color transform (ACT) in a video decoder.

The Adaptive Colour Transform (ACT) was adopted into the HEVC Screen Content Coding (SCC) test model 2 at the 18$^{th}$ JCT-VC meeting (Jun. 30 to Jul. 9, 2014, Sapporo, Japan). ACT performs in-loop color space conversion in the prediction residual domain using color transform matrices based on the YCoCg and YCoCg-R color spaces. ACT is turned on or off adaptively at the CU level using the flag cu_residual_act_flag. ACT can be combined with Cross Component Prediction (CCP), which is another inter component de-correlation method already supported in HEVC. When both are enabled, ACT is performed after CCP at the decoder, as shown in FIG. 1.

2.1.1. Color Space Conversion in ACT

The color space conversion in ACT is based on the YCoCg-R transform. Both lossy coding and lossless coding (cu_transquant_bypass_flag=0 or 1) use the same inverse transform, but an additional 1-bit left shift is applied to the Co and Cg components in the case of lossy coding. Specifically, the following color space transforms are used for forward and backward conversion for lossy and lossless coding:

Forward Transform for Lossy Coding (Non-Normative):

$$\begin{bmatrix} Y \\ Co \\ Cg \end{bmatrix} = \begin{bmatrix} 1 & 2 & 1 \\ 2 & 0 & -2 \\ -1 & 2 & -1 \end{bmatrix} \begin{bmatrix} R \\ G \\ B \end{bmatrix} /4$$

Forward Transform for Lossless Coding (Non-Normative):

$Co=R-B$ $t=B+(Co>>1)$ $Cg=(G-t)$ $Y=t+(Cg>>1)$

Backward Transform (Normative):

if (lossy){

$Co = Co \ll 1$ $Cg = Cg \ll 1$

}

$t = Y - (Cg \gg 1)$ $G = Cg + t$ $B = t - (Co \gg 1)$ $R = Co + b$

The forward color transform is not normalized, with its norm being roughly equal to $\sqrt{6}/4$ for Y and Cg and equal to $\sqrt{2}/2$ for Co. In order to compensate for the non-normalized nature of the forward transform, delta QPs of (−5, −3, −5) are applied to (Y, Co, Cg), respectively. In other words, for a given "normal" QP for the CU, if ACT is turned on, then the quantization parameter is set equal to (QP−5, QP−3, QP−5) for (Y, Co, Cg), respectively. The adjusted quantization parameter only affects the quantization and inverse quantization of the residuals in the CU. For deblocking, the "normal" QP value is still used. Clipping to 0 is applied to the adjusted QP values to ensure that they will not become negative. Note that this QP adjustment is only applicable to lossy coding, as quantization is not performed in lossless coding (cu_transquant_bypass_flag=1). In SCM 4, PPS/slice-level signalling of additional QP offset values is introduced. These QP offset values may be used instead of (−5, −3, −5) for CUs when adaptive color transform is applied.

When the input bit-depths of the color components are different, appropriate left shifts are applied to align the sample bit-depths to the maximal bit-depth during ACT, and appropriate right shifts are applied to restore the original sample bit-depths after ACT.

2.2. ACT in VVC

Figure 2:
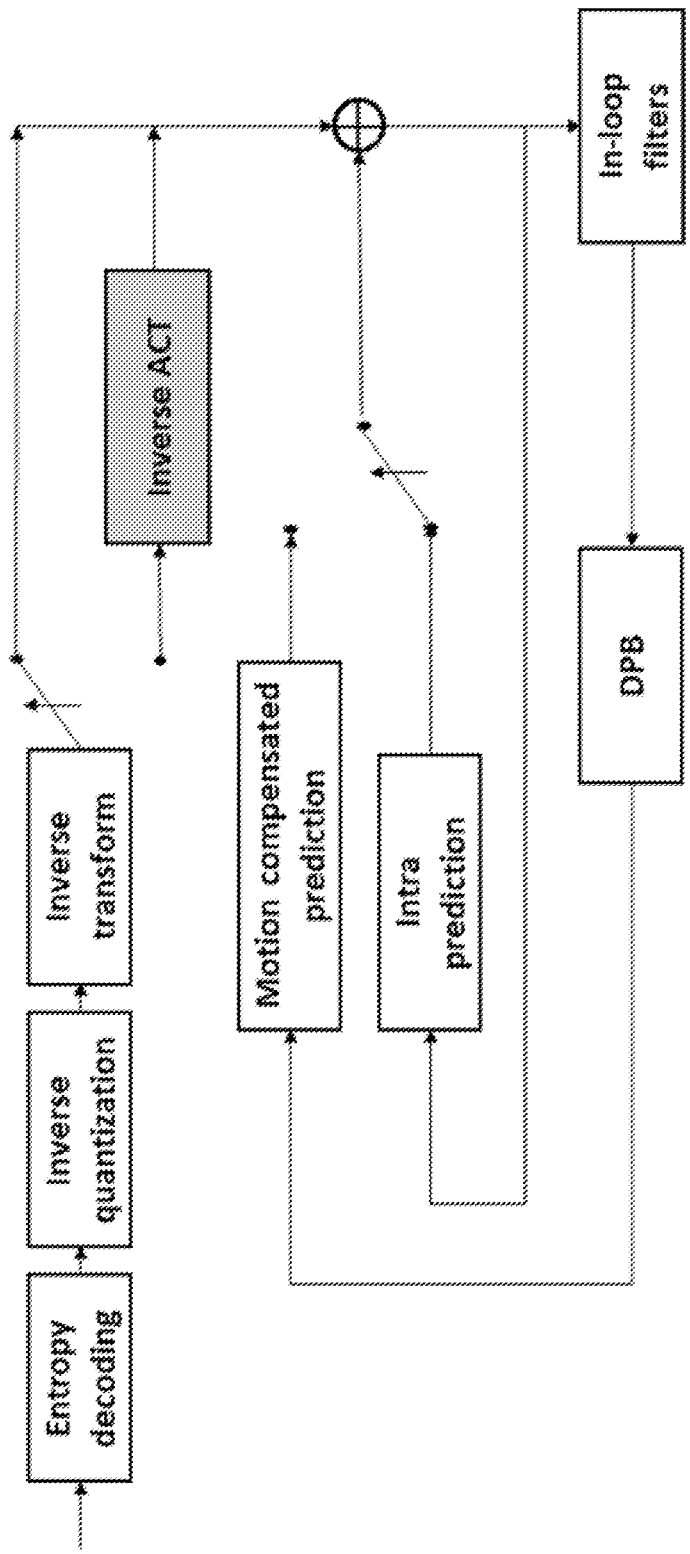
FIG. 2 illustrates an example decoding process with the ACT.

FIG. 2 illustrates the decoding flowchart of VVC with the ACT be applied. As illustrated in FIG. 2, the color space conversion is carried out in residual domain. Specifically, one additional decoding module, namely inverse ACT, is introduced after inverse transform to convert the residuals from YCgCo domain back to the original domain.

In the VVC, unless the maximum transform size is smaller than the width or height of one coding unit (CU), one CU leaf node is also used as the unit of transform processing. Therefore, in the proposed implementation, the ACT flag is signaled for one CU to select the color space for coding its residuals. Additionally, following the HEVC ACT design, for inter and IBC CUs, the ACT is only enabled when there is at least one non-zero coefficient in the CU. For intra CUs, the ACT is only enabled when chroma components select the same intra prediction mode of luma component, i.e., DM mode.

The core transforms used for the color space conversions are kept the same as that used for the HEVC. Additionally, same with the ACT design in HEVC, to compensate the dynamic range change of residuals signals before and after color transform, the QP adjustments of (−5, −5, −3) are applied to the transform residuals.

On the other hand, the forward and inverse color transforms need to access the residuals of all three components.

Correspondingly, in the proposed implementation, the ACT is disabled in the following two scenarios where not all residuals of three components are available.
1. Separate-tree partition: when separate-tree is applied, luma and chroma samples inside one CTU are partitioned by different structures. This results in that the CUs in the luma-tree only contains luma component and the CUs in the chroma-tree only contains two chroma components.
2. Intra sub-partition prediction (ISP): the ISP sub-partition is only applied to luma while chroma signals are coded without splitting. In the current ISP design, except the last ISP sub-partitions, the other sub-partitions only contain luma component.

The texts of a coding unit in the VVC draft are shown as below.

| | Descriptor |
|---|---|
| coding_unit( x0, y0, cbWidth, cbHeight, cqtDepth, treeType, modeType ) { | |
|   cHType = treeType == DUAL_TREE_CHROMA ? 1 : 0 | |
|   if( slice_type != I \|\| sps_ibc_enabled_flag ) { | |
|     if( treeType != DUAL_TREE_CHROMA && | |
|       ( ( !( cbWidth == 4 && cbHeight == 4 ) && modeType != MODE_TYPE_INTRA ) | |
|       \|\| ( sps_ibc_enabled_flag && cbWidth <= 64 && cbHeight <= 64 ) ) ) | |
|       cu_skip_flag[ x0 ][ y0 ] | ae(v) |
|     if( cu_skip_flag[ x0 ][ y0 ] == 0 && slice_type != I | |
|       && !( cbWidth == 4 && cbHeight == 4) == MODE_TYPE_ALL ) | |
|       pred_mode_flag | |
|     if( ( ( slice_type == I && cu_skip_flag[ x0 ][ y0 ] = =0 ) \|\| | |
|       ( slice_type != I && ( CuPredMode[ chType ][ x0 ][ y0 ] != MODE _INTRA \|\| | |
|       ( ( ( cbWidth == 4 && cbHeight == 4 ) \|\| modeType == MODE_TYPE_INTRA ) | |
|       && cu_skip_flag[ x0 ][ y0 ] == 0 ) ) ) ) && | |
|       cbWidth <= 64 && cbHeight <= 64 && modeType != MODE_TYPE_INTER && | |
|       sps_ibc_enabled_flag && treeType != DUAL_TREE_CHROMA ) | |
|       pred_mode_ibc_flag | ae(v) |
|   } | |
|   if( CuPredMode[ chType ][ x0 ][ y0 ] == MODE_INTRA && sps_palette_enabled_flag && | |
|     cbWidth <= 64 && cbHeight <= 64 && cu_skip_flag[ x0 ][ y0 ] == 0 && | |
|     mode Type != MODE_TYPE_INTER ) | |
|     pred_mode_plt_flag | ae(v) |
|   } | |
|   if( CuPredMode[ chType ][ x0 ][ y0 ] == MODE_INTRA && sps_act_enabled_flag && | |
|     treeType == SINGLE_TREE ) | |
|     cu_act_enabled_flag | |
|   if( CuPredMode[ chType ][ x0 ][ y0 ] == MODE_INTRA \|\| | |
|     CuPredMode[ chType ][ x0 ][ y0 ] == MODE_PLT ) { | |
|     if( treeType == SINGLE_TREE \|\| treeType == DUAL_TREE_LUMA ) { | |
|       if( pred_mode_plt_flag ) { | |
|         palette_coding( x0, y0, cbWidth, cbHeight, treeType ) | |
|       } else { | |
|         if( sps_bdpcm_enabled_flag && | |
|           cbWidth <= MaxTsSize && cbHeight <= MaxTsSize ) | |
|           intra_bdpcm_luma_flag | ae(v) |
|         if( intra_bdpcm_luma_flag ) | |
|           intra_bdpcm_luma_dir_flag | ae(v) |
|         else { | |
|           if( sps_mip_enabled_flag ) | |
|           intra_mip_flag[ x0 ][ y0 ] | ae(v) |
|           if( intra_mip_flag[ x0 ][ y0 ] ) { | |
|             intra_mip_transposed[ x0 ][ y0 ] | ae(v) |
|             intra_mip_mode[ x0 ][ y0 ] | ae(v) |
|           }else { | |
|             if( sps_mrl_enabled_flag && ( ( y0 % CtbSizeY ) > 0 ) ) | |
|             intra_luma_ref_idx[ x0 ][ y0 ] | ae(v) |
|             if( sps_isp_enabled_flag && intra_luma_ref_idx[ x0 ][ y0 ] == 0 && | |
|               ( cbWidth <= MaxTbSizeY && cbHeight <= MaxTbSizeY ) && | |
|               ( cbWidth * cbHeight > MinTbSizeY * MinTbSizeY ) && !cu_act_enabled_flag ) | |
|             intra_subpartitions_mode_flag[ x0 ][ y0 ] | ae(v) |
|             if( intra_subpartitions_mode_flag[ x0 ][ y0 == 1 ) | |
|             intra_subpartitions_split_flag[ x0 ][ y0 ] | ae(v) |
|             if( intra_luma_ref idx[ x0 ][ y0 ] == 0 ) | |
|             intra_luma_mpm_flag[ x0 ][ y0 ] | ae(v) |
|             if( intra_luma_mpm_flag[ x0 ][ y0 ] ) { | |
|               if( intra_luma_ref idx[ x0 ][ y0 ] == ) | |
|               intra_luma_not_planar_flag[ x0 ][ y0 ] | ae(v) |
|               if( intra_luma_not_planar_flag[ x0 ][ y0 ] ) | |

|  | Descriptor |
|---|---|
|         intra_luma_mpm_idx[ x0 ][ y0 ] | ae(v) |
|        } else |  |
|         intra_luma_mpm_remainder[ x0 ][ y0 ] | ae(v) |
|       } |  |
|      } |  |
|     } |  |
|    } |  |
|   if( ( treeType == SINGLE_TREE || treeType == DUAL_TREE_CHROMA ) && |  |
|     ChromaArrayType != 0) { |  |
|    if( pred_mode_plt_flag && treeType == DUAL_TREE_CHROMA ) |  |
|     palette_coding( x0, y0, cbWidth / SubWidthC, cbHeight / SubHeightC, treeType) |  |
|    else { |  |
|     *if( !cu_act_enabled_flag )*  { |  |
|      if( cbWidth <= MaxTsSize && cbHeight <= MaxTsSize && |  |
|       sps_bdpcm_chroma_enabled_flag ) { |  |
|      intra_bdpcm_chroma_flag | ae(v) |
|      if( intra_bdpcm_chroma_flag ) |  |
|       intra_bdpcm_chroma_dir_flag | ae(v) |
|     } else { |  |
|      if( CclmEnabled ) |  |
|       cclm_mode_flag | ae(v) |
|      if( cclm_mode_flag ) |  |
|       cclm_mode_idx | ae(v) |
|      else |  |
|       intra_chroma_pred_mode | ae(v) |
|     } |  |
|    } |  |
|   } |  |
|  } |  |
| } else if( treeType != DUAL_TREE_CHROMA ) { /* MODE_INTER or MODE_IBC */ |  |
|  if( cu_skip_flag[ x0 ][ y0 ] == 0) |  |
|   general_merge_flag[ x0 ][ y0 ] | ae(v) |
|  if( general_merge_flag[ x0 ][ y0 ] ) |  |
|   merge_data( x0, y0, cbWidth, cbHeight, chType ) |  |
|  else if( CuPredMode[ chType ][ x0 ][ y0 ] == MODE_IBC ) { |  |
|   mvd_coding( x0, y0, 0, 0 ) |  |
|   if( MaxNumIbcMergeCand > 1 ) |  |
|    mvp_l0_flag[ x0 ][ y0 ] | ae(v) |
|   if( sps_amvr_enabled_flag && |  |
|    ( MvdL0[ x0 ][ y0 ][ 0 ] != 0 || MvdL0[ x0 ][ y0 ][ 1 ] != 0 ) ) |  |
|    amvr_precision_idx[ x0 ][ y0 ] | ae(v) |
|  } else { |  |
|   if( slice_type = = B ) |  |
|    inter_pred_idc[ x0 ][ y0 ] | ae(v) |
|   if( sps_affine_enabled_flag && cbWidth >= 16 && cbHeight >= 16 ) { |  |
|    inter_affine_flag[ x0 ][ y0 ] | ae(v) |
|    if( sps_affine_type_flag && inter_affine_flag[ x0 ][ y0 ] ) |  |
|     cu_affine_type_flag[ x0 ][ y0 ] | ae(v) |
|   } |  |
|   if( sps_smvd_enabled_flag && !mvd_l1_zero_flag && |  |
|    inter_pred_idc[ x0 ][ y0 ] == PRED_BI && |  |
|    !inter_affine_flag[ x0 ][ y0 ] && RefIdxSymL0 >−1 && RefIdxSymL1 > −1 ) |  |
|    sym_mvd_flag[ x0 ][ y0 ] | ae(v) |
|   if( inter_pred_idc[ x0 ][ y0 ] != PRED_L1 ) { |  |
|    if( NumRefIdxActive[ 0 ] > 1 && !sym_mvd_flag[ x0 ][ y0 ] ) |  |
|     ref_idx_l0[ x0 ][ y0 ] | ae(v) |
|    mvd_coding( x0, y0, 0, 0) |  |
|    if( MotionModelIdc[ x0 ][ y0 ] > 0 ) |  |
|     mvd_coding( x0, y0, 0, 1 ) |  |
|    if(MotionModelIdc[ x0 ][ y0 ] > 1 ) |  |
|     mvd_coding( x0, y0, 0, 2 ) |  |
|    mvp_l0_flag[ x0 ][ y0 ] | ae(v) |
|   } else { |  |
|    MvdL0[ x0 ][ y0 ][ 0 ] = 0 |  |
|    MvdL0[ x0 ][ y0 ][ 1 ] = 0 |  |
|   } |  |
|   if( inter_pred_idc[ x0 ][ y0 ] != PRED_L0 ) { |  |
|    if( NumRefIdxActive[ 1 ] > 1 && !sym_mvd_flag[ x0 ][ y0 ] ) |  |
|     ref_idx_l1[ x0 ][ y0] | ae(v) |
|    if( mvd_l1_zero_flag && inter_pred_idc[ x0 ][ y0 ] == PRED_BI ) { |  |
|     MvdL1[ x0 ][ y0 ][ 0 ] = 0 |  |
|     MvdL1[ x0 ][ y0 ][ 1 ] = 0 |  |
|     MvdCpL1[ x0 ][ y0 ][ 0 ][ 0 ] = 0 |  |
|     MvdCpL1[ x0 ][ y0 ][ 0 ][ 1 ] = 0 |  |
|     MvdCpL1[ x0 ][ y0 ][ 1 ][ 1 ] = 0 |  |
|     MvdCpL1[ x0 ][ y0 ][ 1 ][ 1 ] = 0 |  |
|     MvdCpL1[ x0 ][ y0 ][ 2 ][ 0 ] = 0 |  |

|  | Descriptor |
|---|---|
| ``` |  |
|             MvdCpL1[ x0 ][ y0 ][ 2 ][ 1 ] = 0 |  |
|         } else { |  |
|             if( sym_mvd_flag[ x0 ][ y0 ] ) { |  |
|                 MvdL1[ x0 ][ y0 ][ 0 ] = −MvdL0[ x0 ][ y0 ][ 0 ] |  |
|                 MvdL1[ x0 ][ y0 ][ 1 ] = −MvdL0[ x0 ][ y0 ][ 1 ] |  |
|             } else |  |
|                 mvd_coding( x0, y0, 1, 0 ) |  |
|             if( MotionModelIdc[ x0 ][ y0 ] > 0 ) |  |
|                 mvd_coding( x0, y0, 1, 1 ) |  |
|             if(MotionModelIdc[ x0 ][ y0 ] > 1) |  |
|                 mvd_coding( x0, y0, 1, 2 ) |  |
|         } |  |
|         mvp_l1[ x0 ][ y0 ] | ae(v) |
|     } else { |  |
|         MvdL1[ x0 ][ y0 ][ 0 ] = 0 |  |
|         MvdL1[ x0 ][ y0 ][ 1 ] = 0 |  |
|     } |  |
|     if( ( sps_amvr_enabled_flag && inter_affine_flag[ x0 ][ y0 ] == 0 && |  |
|         ( MvdL0[ x0 ][ y0 ][ 0 ] != 0 ΙΙ MvdL0[ x0 ][ y0 ][ 1 ] != 0 ΙΙ |  |
|           MvdL1[ x0 ][ y0 ][ 0 ] != 0 ΙΙ MydL1[ x0 ][ y0 ][ 1 ] != 0 ) ) ΙΙ |  |
|         ( sps_affine_amvr_enabled_flag && inter_affine_flag[ x0 ][ y0 ] == 1 && |  |
|           ( MvdCpL0[ x0 ][ y0 ][ 0 ][ 0 ] != 0 ΙΙ MvdCpL0[ x0 ][ y0 ][ 0 ][ 1 ] != 0 ΙΙ |  |
|             MvdCpL1[ x0 ][ y0 ][ 0 ][ 0 ] != 0 ΙΙ MvdCpL1[ x0 ][ y0 ][ 0 ][ 1 ] != 0 ΙΙ |  |
|             MvdCpL0[ x0 ][ y0 ][ 1 ][ 0 ] != 0 ΙΙ MvdCpL0[ x0 ][ y0 ][ 1 ][ 1 ] != 0 ΙΙ |  |
|             MvdCpL1[ x0 ][ y0 ][ 1 ][ 0 ] != 0 ΙΙ MvdCpL1[ x0 ][ y0 ][ 1 ][ 1 ] != 0 ΙΙ |  |
|             MvdCpL0[ x0 ][ y0 ][ 2 ][ 0 ] != 0 ΙΙ MvdCpL0[ x0 ][ y0 ][ 2 ][ 1 ] != 0 ΙΙ |  |
|             MvdCpL1[ x0 ][ y0 ][ 2 ][ 0 ] != 0 ΙΙ MvdCpL1[ x0 ][ y0 ][ 2 ][ 1 ] != 0 ΙΙ { |  |
|         amvr_flag[ x0 ][ y0 ] | ae(v) |
|         if( amvr_flag[ x0 ][ y0 ] ) |  |
|             amvr_precision_idx[ x0 ][ y0 ] | ae(v) |
|     } |  |
|     if( sps_bcw_enabled_flag && inter_pred_idc[ x0 ][ y0 ] == PRED_BI && |  |
|         luma_weight_l0_flag[ ref idx_l0 [ x0 ][ y0 ] ] == 0 && |  |
|         luma_weight_l1_flag[ ref idx_l1 [ x0 ][ y0 ] ] == 0 && |  |
|         chroma_weight_l0_flag[ ref idx_l0 [ x0 ][ y0 ] ] == 0 && |  |
|         chroma_weight_l1_flag[ ref idx_l1 [ x0 ][ y0 ] ] == 0 && |  |
|         cbWidth * cbHeight >= 256 ) |  |
|         bcw_idx[ x0 ][ y0 ] | ae(v) |
|     } |  |
| } |  |
| if( CuPredMode[ chType ][ x0 ][ y0 ] != MODE_INTRA && !pred_mode_plt_flag && |  |
|     general_merge_flag[ x0 ][ y0 ] == 0 ) |  |
|     cu_cbf | ae(v) |
| if( cu_cbf ) { |  |
|     if( CuPredMode[ chType ][ x0 ][ y0 ] == MODE_INTER && sps_sbt_enabled_flag |  |
|         && !ciip_flag[ x0 ][ y0 ] && !MergeTriangleFlag[ x0 ][ y0 ] |  |
|         && cbWidth <= MaxTbSizeY && cbHeight <= MaxTbSizeY ) { |  |
|         allowSbtVerH = cbWidth >= 8 |  |
|         allowSbtVerQ = cbWidth >= 16 |  |
|         allowSbtHorH = cbHeight >= 8 |  |
|         allowSbtHorQ = cbHeight >= 16 |  |
|         if( allowSbtVerH ΙΙ allowSbtHorH ) |  |
|             cu_sbt_flag | ae(v) |
|         if( cu_sbt_flag ) { |  |
|             if( ( allowSbverH ΙΙ allowSbtHorH ) && ( allowSbtVerQ ΙΙ allowSbtHorQ ) ) |  |
|                 cu_sbt_quad_flag | ae(v) |
|             if( ( cu_sbt_quad_flag && allowSbtVerQ && allowSbtHorQ ) ΙΙ |  |
|                 ( !cu_sbt_quad_flag && allowSbtVerH && allowSbtHorH ) ) |  |
|                 cu_sbt_horizontal_flag | ae(v) |
|             cu_sbt_pos_flag | ae(v) |
|         } |  |
|     } |  |
|     if( sps_act_enabled_flag && CuPredMode[ chType ][ x0 ][ y0 ] != MODE_INTRA && |  |
|         treeType == SINGLE_TREE ) |  |
|         cu_act_enabled_flag     ae(v) |  |
|     LfnstDcOnly = 1 |  |
|     LfnstZernOutSigCoeffFlag = 1 |  |
|     MtsZernOutSigCoeffFlag = 1 |  |
|     transform_tree( x0, y0, cbWidth, cbHeight, treeType, chType) |  |
|     lfnstWidth = ( treeType == DUAL_TREE_CHROMA) ? cbWidth / Sub WidthC |  |
|                     : ( ( IntraSubPartitionsSplitType == ISP_VER_SPLIT ) ? cbWidth / |  |
|                         NumIntraSubPartitions : cbWidth) |  |
|     lfnstHeight = ( treeType == DUAL_TREE_CHROMA) ? cbHeight / SubHeightC |  |
|                     : ( ( IntraSubPartitionsSplitType == ISP_HOR_SPLIT) ? cbHeight / |  |
|                         NumIntraSubPartitions : cbHeight) |  |
|     if( Min( lfnstWidth, lfnstHeight ) >= 4 && sps_lfnst_enabled_flag == 1 && |  |
|         CuPredMode[ chType ][ x0 ][ y0 ] == MODE_INTRA && |  |

-continued

|  | Descriptor |
|---|---|
| ```
        transform_skip_flag[ x0 ][ y0 ][ 0 ] == 0 &&
        ( treeType != DUAL_TREE_CHROMA || !intra_mip_flag[ x0 ][ y0 ] ||
          Min( lfnstWidth, lfnstHeight ) >= 16 ) &&
        Max( cbWidth, cbHeight) <= MaxTbSizeY) {
        if( ( IntraSubPartitionsSplitType != ISP_NO_SPLIT || LfnstDcOnly == 0 ) &&
          LfnstZeroOutSigCoeffFlag == 1 )
          lfnst_idx
      }
      if( treeType != DUAL_TREE_CHROMA && lfnst_idx == 0 &&
        transform_skip_flag[ x0 ][ y0 ][ 0 ] == 0 && Max( cbWidth, cbHeight) <= 32 &&
        IntraSubPartitionsSplit[ x0 ][ y0 ] == ISP_NO_SPLIT && cu_sbt_flag == 0 &&
        MtsZeroOutSigCoeffFlag == 1 && tu_cbf_luma[ x0 ][ y0 ] ) {
        if( ( ( CuPredMode[ chType ][ x0 ][ y0 ] == MODE_INFER &&
          sps_explicit_mts_inter_enabled_flag ) ||
          ( CuPredMode[ chType ][ x0 ][ y0 ] == MODE_INTRA &&
          sps_explicit_mts_intra_enabled_flag ) ) )
          mts_idx
      }
    }
``` | ae(v)<br><br><br><br><br><br><br><br><br><br><br><br>ae(v)<br>ae(v) | cu_act_enabled_flag equal to 1 specifies that the residuals of the current coding unit are coded in $YC_gC_o$ color space. cu_act_enabled_flag equal to 0 specifies that the residuals of the current coding unit are coded in original color space. When cu_act_enabled_flag is not present, it is inferred to be equal to 0.

2.3. Transform Skip Mode in VVC

As in HEVC, the residual of a block can be coded with transform skip mode which completely skip the transform process for a block. In addition, for transform skip blocks, a minimum allowed Quantization Parameter (QP) signaled in SPS is used, which is set equal to 6*(internalBitDepth−inputBitDepth)+4 in VTM7.0.

2.4. Block-Based Delta Pulse Code Modulation (BDPCM)

In JVET-M0413, a block-based Delta Pulse Code Modulation (BDPCM) is proposed to code screen contents efficiently and then adopted into VVC.

The prediction directions used in BDPCM can be vertical and horizontal prediction modes. The intra prediction is done on the entire block by sample copying in prediction direction (horizontal or vertical prediction) similar to intra prediction. The residual is quantized and the delta between the quantized residual and its predictor (horizontal or vertical) quantized value is coded. This can be described by the following: For a block of size M (rows)×N (cols), let $r_{i,j}$, $0 \leq i \leq M-1$, $0 \leq j \leq N-1$ be the prediction residual after performing intra prediction horizontally (copying left neighbor pixel value across the predicted block line by line) or vertically (copying top neighbor line to each line in the predicted block) using unfiltered samples from above or left block boundary samples. Let $Q(r_{i,j})$, $0 \leq i \leq M-1$, $0 \leq j \leq N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signalled:

$$\tilde{r}_{i,j} = \begin{cases} Q(r_{i,j}), & i=0, 0 \leq j \leq (N-1) \\ Q(r_{i,j}) - Q(r_{(i-1),j}), & 1 \leq i \leq (M-1), 0 \leq j \leq (N-1) \end{cases}.$$

For horizontal prediction, similar rules apply, and the residual quantized samples are obtained by $$\tilde{r}_{i,j} = \begin{cases} Q(r_{i,j}), & 0 \leq i \leq (M-1), j=0 \\ Q(r_{i,j}) - Q(r_{i,(j-1)}), & 0 \leq i \leq (M-1), 1 \leq j \leq (N-1) \end{cases}.$$

The residual quantized samples $\tilde{r}_{i,j}$ are sent to the decoder.

On the decoder side, the above calculations are reversed to produce $Q(r_{i,j})$, $0 \leq i \leq M-1$, $0 \leq j \leq N-1$.

For Vertical Prediction Case, $$Q(r_{i,j}) = \Sigma_{k=0}^{i} \tilde{r}_{k,j}, 0 \leq i \leq (M-1), 0 \leq j \leq (N-1).$$

For Horizontal Case, $$Q(r_{i,j}) = \Sigma_{k=0}^{j} \tilde{r}_{i,k}, 0 \leq i \leq (M-1), 0 \leq j \leq (N-1).$$

The inverse quantized residuals, $Q^{-1}(Q(r_{i,j}))$, are added to the intra block prediction values to produce the reconstructed sample values.

The main benefit of this scheme is that the inverse BDPCM can be done on the fly during coefficient parsing simply adding the predictor as the coefficients are parsed or it can be performed after parsing.

In VTM7.0, the BDPCM also can be applied on chroma blocks and the chroma BDPCM has a separate flag and BDPCM direction from the luma BDPCM mode.

2.5. Scaling Process for Transform Coefficients

The texts related to scaling process for transform coefficients in JVET-P2001-vE is given as follows.

Inputs to this process are:

a luma location (xTbY, yTbY) specifying the top-left sample of the current luma transform block relative to the top-left luma sample of the current picture, a variable nTbW specifying the transform block width, a variable nTbH specifying the transform block height, a variable predMode specifying the prediction mode of the coding unit, a variable cIdx specifying the color component of the current block.

Output of this process is the (nTbW)×(nTbH) array d of scaled transform coefficients with elements d[x][y].

The quantization parameter qP is derived as follows:
If cIdx is equal to 0, the following applies:

$qP=Qp'_Y$ (1129)

Otherwise, if TuCResMode[xTbY][yTbY] is equal to 2, the following applies:

$qP=Qp'_{CbCr}$ (1130)

Otherwise, if cIdx is equal to 1, the following applies:

$qP=Qp'_{Cb}$ (1131)

Otherwise (cIdx is equal to 2), the following applies:

$qP=Qp'_{Cr}$ (1132)

The quantization parameter qP is modified and the variables rectNonTsFlag and bdShift are derived as follows:
If transform_skip_flag[xTbY][yTbY][cIdx] is equal to 0, the following applies:

$qP=qP-(\text{cu\_act\_enabled\_flag}[xTbY][yTbY]?5:0)$ (1133)

$\text{rectNonTsFlag}=(((\text{Log }2(nTbW)+\text{Log }2(nTbH))\&1)==1)?1:0$ (1134)

$\text{bdShift}=\text{BitDepth}+\text{rectNonTsFlag}+((\text{Log }2(nTbW)+\text{Log }2(nTbH))/2)-5+\text{pic\_dep\_quant\_enabled\_flag}$ (1135)

Otherwise (transform_skip_flag[xTbY][yTbY][cIdx] is equal to 1), the following applies:

$qP=\text{Max}(\text{QpPrimeTsMin},qP)-(\text{cu\_act\_enabled\_flag}[xTbY][yTbY]?5:0)$ (1136)

rectNonTsFlag=0 (1137)

bdShift=10 (1138)

The variable bdOffset is derived as follows:

$bd\text{Offset}=(1<<bd\text{Shift})>>1$ (1139)

The list levelScale[ ][ ] is specified as levelScale[j][k]={{40, 45, 51, 57, 64, 72}, {57, 64, 72, 80, 90, 102}} with j=0 . . . 1, k=0 . . . 5.
The (nTbW)×(nTbH) array dz is set equal to the (nTbW)×(nTbH) array TransCoeffLevel[xTbY][yTbY][cIdx].
For the derivation of the scaled transform coefficients d[x][y] with x=0 . . . nTbW−1, y=0 . . . nTbH−1, the following applies:
The intermediate scaling factor m[x][y] is derived as follows:
If one or more of the following conditions are true, m[x][y] is set equal to 16:
sps_scaling_list_enabled_flag is equal to 0.
pic_scaling_list_present_flag is equal to 0.
transform_skip_flag[xTbY][yTbY][cIdx] is equal to 1.
scaling_matrix_for_lfnst_disabled_flag is equal to 1 and lfnst_idx[xTbY][yTbY] is not equal to 0.
Otherwise, the following applies:
The variable id is derived based on predMode, cIdx, nTbW, and nTbH as specified in Table 36 and the variable log 2MatrixSize is derived as follows:

$\log 2\text{MatrixSize}=(\text{id}<2)?1:(\text{id}<8)?2:3$ (1140)

The scaling factor m[x][y] is derived as follows:

$m[x][y]=\text{ScalingMatrixRec}[\text{id}][i][j]$ with $i=(x<<\log 2\text{MatrixSize})>>\text{Log }2(nTbW)$, (1141)

$j=(y<<\log 2\text{MatrixSize})>>\text{Log }2(nTbH)$

If id is greater than 13 and both x and y are equal to 0, m[0][0] is further modified as follows:

$m[0][0]=\text{ScalingMatrixDCRec}[\text{id}-14]$ (1142)

NOTE—A quantization matrix element m[x][y] can be zeroed out when any of the following conditions is true
x is greater than 32
y is greater than 32
The decoded tu is not coded by default transform mode (i.e. transform type is not equal to 0) and x is greater than 16
The decoded tu is not coded by default transform mode (i.e. transform type is not equal to 0) and y is greater than 16
The scaling factor ls[x][y] is derived as follows:
If pic_dep_quant_enabled_flag is equal to 1 and transform_skip_flag[xTbY][yTbY][cIdx] is equal to 0, the following applies:

$ls[x][y]=(m[x][y]*\text{levelScale}[\text{rectNonTsFlag}][(qP+1)\% 6])<<((qP+1)/6)$ (1143)

Otherwise (pic_dep_quant_enabled_flag is equal to 0 or transform_skip_flag[xTbY][yTbY][cIdx] is equal to 1), the following applies:

$ls[x][y]=(m[x][y]*\text{levelScale}[\text{rectNonTsFlag}][qP\%6])<<(qP/6)$ (1144)

When BdpcmFlag[xTbY][yYbY][cIdx] is equal to 1, dz[x][y] is modified as follows:
If BdpcmDir[xTbY][yYbY][cIdx] is equal to 0 and x is greater than 0, the following applies:

$dz[x][y]=\text{Clip3}(\text{CoeffMin},\text{CoeffMax},dz[x-1][y]+dz[x][y])$ (1145)

Otherwise, if BdpcmDir[xTbY][yTbY][cIdx] is equal to 1 and y is greater than 0, the following applies:

$dz[x][y]=\text{Clip3}(\text{CoeffMin},\text{CoeffMax},dz[x][y-1]+dz[x][y])$ (1146)

The value dnc[x][y] is derived as follows:

$dnc[x][y]=(dz[x][y]*ls[x][y]+bd\text{Offset})>>bd\text{Shift}$ (1147)

The scaled transform coefficient d[x][y] is derived as follows:

$d[x][y]=\text{Clip3}(\text{CoeffMin},\text{CoeffMax},dnc[x][y])$ (1148)

TABLE 36

Specification of the scaling matrix identifier variable id according to predMode, cIdx, nTbW, and nTbH

| max(nTbW, nTbH) | | 2 | 4 | 8 | 16 | 32 | 64 |
|---|---|---|---|---|---|---|---|
| predMode = MODE INTRA | cIdx = 0 (Y) | | 2 | 8 | 14 | 20 | 26 |
| | cIdx = 1 (Cb) | | 3 | 9 | 15 | 21 | 21 |
| | cIdx = 2 (Cr) | | 4 | 10 | 16 | 22 | 22 |
| predMode = MODE INTER (INTER, IBC) | cIdx = 0 (Y) | | 5 | 11 | 17 | 23 | 27 |
| | cIdx = 1 (Cb) | 0 | 6 | 12 | 18 | 24 | 24 |
| | cIdx = 2 (Cr) | 1 | 7 | 13 | 19 | 25 | 25 |

3. TECHNICAL PROBLEMS SOLVED BY EMBODIMENTS AND SOLUTIONS DESCRIBED HEREIN

1. In the current design, the ACT and luma BDPCM modes can be enabled for one block. However, the chroma BDPCM mode is always disabled on blocks coded with ACT mode. Therefore, the prediction signal may be derived differently for luma and chroma blocks in the same coding unit which may be less efficient.
2. The quantization parameter (QP) of a block may become a minus number when ACT is enabled.
3. The current design of ACT does not support lossless coding.

4. EXAMPLES OF TECHNICAL SOLUTIONS

The technical solutions described below should be considered as examples to explain general concepts. These technical solutions should not be interpreted in a narrow way. Furthermore, these technical solutions can be combined in any manner.

In the following description, the term 'block' may represent a video region, such as a coding unit (CU), a prediction unit (PU), a transform unit (TU), which may contain samples in three color components. The term 'BDPCM' is not limited to the design in VVC, but it may present the technologies that coding residuals using different prediction signal generation methods.

Example Embodiments for Interactions Between ACT and BDPCM

1. Whether to enable chroma BDPCM mode may depend on the usage of ACT and/or luma BDPCM mode.
   a. In one example, when ACT is enabled on a block, the indication of the usage of chroma BDPCM mode (e.g. intra_bdpcm_chroma_flag) may be inferred to be the indication of the usage of the luma BDPCM mode (e.g. intra_bdpcm_luma_flag).
      i. In one example, the inferred value of chroma BDPCM mode is defined as (ACT and luma BDPCM modes are enabled? true: false).
         1. In one example, the intra_bdpcm_chroma_flag may be set equal to false when intra_bdpcm_luma_flag is false.
            a. Alternatively, the intra_bdpcm_chroma_flag may be set equal to true when intra_bdpcm_luma_flag is true.
      ii. Alternatively, in one example, the indication of the usage of chroma BDPCM mode may be inferred to be true if the indication of the usage of the luma BDPCM mode and ACT for the block are true.
   b. Alternatively, whether to signal the usage of ACT for a block may be conditionally checked, such as the same BDPCM prediction direction is used for both luma and chroma samples in the block.
      i. Alternatively, furthermore, indication of usage of ACT is signalled after usage of BDPCM modes.
2. When ACT is enabled on a block, the indication of the prediction direction of chroma BDPCM mode (e.g. intra_bdpcm_chroma_dir_flag) may be inferred to be the indication of the prediction direction of the usage of the luma BDPCM mode (e.g. intra_bdpcm_luma_dir_flag).
   a. In one example, the inferred value of intra_bdpcm_chroma_dir_flag is defined as (ACT is enabled? intra_bdpcm_luma_dir_flag: 0).
      i. In one example, the indication of the prediction direction of chroma BDPCM mode may be inferred to horizontal if the indication of the prediction direction of the luma BDPCM mode is horizontal.
      ii. Alternatively, in one example, the indication of the prediction direction of chroma BDPCM mode may be inferred to vertical if the indication of the prediction direction of the luma BDPCM mode is vertical.
3. The ACT and BDPCM modes may be exclusively applied.
   a. In one example, when ACT mode is enabled on a block, the BDPCM mode may be disabled on the block.
      i. Alternatively, furthermore, the indication of usage of BDPCM mode may be signalled after the signalling of the indication of usage of ACT mode.
      ii. Alternatively, furthermore, the indication of usage of BDPCM mode may be not signalled and inferred to false (0).
   b. In one example, when BDPCM mode is enabled on a block, the ACT mode may be disabled on the block.
      i. Alternatively, furthermore, the indication of usage of ACT mode may be signalled after the signalling of the indication of usage of BDPCM mode.
      ii. Alternatively, furthermore, the indication of usage of ACT mode may be not signalled and inferred to false (0).
   c. In one example, the BDPCM mode in the above examples may denote luma BDPCM mode and/or chroma BDPCM mode.
4. Inverse ACT may be applied before reverse BDPCM at the decoder.
   a. In one example, ACT may be applied even when luma and chroma BDPCM have a different prediction mode.
   b. Alternatively, at the encoder, forward ACT may be applied after BDPCM.

Example Embodiments for QP Setting when ACT is Enabled

5. It is proposed to clip the QP when ACT is enabled.
   a. In one example, the clipping function may be defined as (l, h, x), where l is the lowest possible value of the input x and h is the highest possible value of the input x.
      i. In one example, l may be set equal to 0.
      ii. In one example, h may be set equal to 63.
   b. In one example, the QP may be the qP given in Section 2.5.
   c. In one example, the clipping may be performed after the QP adjustment for ACT mode.
   d. In one example, when transform skip is applied, l may be set equal to the minimal allowed QP for transform skip mode.

General Techniques ((Items 6-7)
6. In the above examples, l, h, m, n and/or k are integer numbers and may depend on
   i. A message signaled in the DPS/SPS/VPS/PPS/APS/picture header/slice header/tile group header/Largest coding unit (LCU)/Coding unit (CU)/LCU row/group of LCUs/TU/PU block/Video coding unit
   ii. Position of CU/PU/TU/block/Video coding unit
   iii. Coded modes of blocks containing the samples along the edges
   iv. Transform matrices applied to the blocks containing the samples along the edges
   v. Block dimension/Block shape of current block and/or its neighboring blocks
   vi. Indication of the color format (such as 4:2:0, 4:4:4, RGB or YUV)

vii. Coding tree structure (such as dual tree or single tree)
viii. Slice/tile group type and/or picture type
ix. Color component (e.g. may be only applied on Cb or Cr)
x. Temporal layer ID
xi. Profiles/Levels/Tiers of a standard
xii. Alternatively, a, b, m, n and/or k may be signalled to the decoder.
7. The above proposed methods may be applied under certain conditions.
   a. In one example, the condition is the color format is 4:2:0 and/or 4:2:2.
   b. In one example, indication of usage of the above methods may be signalled in sequence/picture/slice/tile/brick/a video region-level, such as SPS/PPS/picture header/slice header.
   c. In one example, the usage of above methods may depend on
      i. Video contents (e.g. screen contents or natural contents)
      ii. A message signaled in the DPS/SPS/VPS/PPS/APS/picture header/slice header/tile group header/Largest coding unit (LCU)/Coding unit (CU)/LCU row/group of LCUs/TU/PU block/Video coding unit
      iii. Position of CU/PU/TU/block/Video coding unit
      iv. Coded modes of blocks containing the samples along the edges
      v. Transform matrices applied to the blocks containing the samples along the edges
      vi. Block dimension of current block and/or its neighboring blocks
      vii. Block shape of current block and/or its neighboring blocks
      viii. Indication of the color format (such as 4:2:0, 4:4:4, RGB or YUV)
      ix. Coding tree structure (such as dual tree or single tree)
      x. Slice/tile group type and/or picture type
      xi. Color component (e.g. may be only applied on Cb or Cr)
      xii. Temporal layer ID
      xiii. Profiles/Levels/Tiers of a standard
      xiv. Alternatively, m and/or n may be signalled to the decoder.

5. EMBODIMENTS

The embodiments are based on JVET-P2001-vE. The newly added texts are highlight by bold italicized text. The deleted texts are marked by italicized text.

5.1. Embodiment #1

This embodiment is related to interaction between ACT and BDPCM modes.

| | Descriptor |
|---|---|
| coding_unit( x0, y0, cbWidth, cbHeight, cqtDepth, treeType, modeType ) { <br>  chType = treeType == DUAL_TREE_CHROMA ? 1 : 0 <br>  ... <br>  if( CuPredMode[ chType ][ x0 ][ y0 ] == MODE_INTRA && sps_palette_enabled_flag && <br>    cbWidth <= 64 && cbHeight <= 64 && cu_skip_flag[ x0 ][ y0 ] == 0 && <br>    mode Type != MODE_TYPE_INTER ) <br>    pred_mode_plt_flag | ae(v) |
|   } <br>  if( CuPredMode[ chType ][ x0 ][ y0 ] == MODE_INTRA && sps_act_enabled_flag && <br>    treeType == SINGLE_TREE ) <br>    cu_act_enabled_flag | ae(v) |
|   if( CuPredMode[ chType ][ x0 ][ y0 ] == MODE_INTRA \|\| <br>    CuPredMode[ chType ][ x0 ][ y0 ] == MODE_PLT ) { <br>    if( treeType == SINGLE_TREE \|\| treeType == DUAL_TREE_LUMA ) { <br>      if( pred_mode_plt_flag ) { <br>        palette_coding( x0, y0, cbWidth, cbHeight, treeType ) <br>      }else { <br>        if( sps_bdpcm_enabled_flag && <br>          cbWidth <= MaxTsSize && cbHeight <= MaxTsSize <br>    *&& !cu_act_enabled_flag)* <br>        intra_bdpcm_luma_flag | ae(v) |
|         if( intra_bdpcm_luma_flag ) <br>          intra_bdpcm_luma_dir_flag | ae(v) |
|         else { <br>          ... <br>        } <br>      } <br>    } <br>  ... <br>} | |

5.2. Embodiment #2

This embodiment is related to interaction between ACT and BDPCM modes.

intra_bdpcm_chroma_flag equal to 1 specifies that BDPCM is applied to the current chroma coding blocks at the location (x0, y0), i.e. the transform is skipped, the intra chroma prediction mode is specified by intra_bdpcm_chroma_dir_flag. intra_bdpcm_chroma_flag equal to 0 specifies that BDPCM is not applied to the current chroma coding blocks at the location (x0, y0).

When intra_bdpcm_chroma_flag is not presen *and cu_act_enabled_flag is false,* it is inferred to be equal to 0. *When intra_bdpcm_chroma_flag*

*is not present and cu_act_enabled flag is true, it is inferred to be equal to intra_bdpcm_luma_flag.*

The variable BdpcmFlag[x][y][cIdx] is set equal to intra_bdpcm_chroma_flag for x=x0 . . . x0+cbWidth−1, y=y0 . . . y0+cbHeight−1 and cIdx=1 . . . 2.

intra_bdpcm_chroma_dir_flag equal to 0 specifies that the BDPCM prediction direction is horizontal. intra_bdpcm_chroma_dir_flag equal to 1 specifies that the BDPCM prediction direction is vertical. *When cu_act_enabled_flag is true, intra_bdpcm_chroma_dir_flag is set equal to intra_bdpcm_luma_fir_flag.*

The variable BdpcmDir[x][y][cIdx] is set equal to intra_bdpcm_chroma_dir_flag for x=x0 . . . x0+cbWidth−1, y=y0 . . . y0+cbHeight−1 and cIdx=1 . . . 2.

5.3. Embodiment #3

This embodiment is related to QP setting.

8.7.3 Scaling Process for Transform Coefficients

Inputs to this process are:
a luma location (xTbY, yTbY) specifying the top-left sample of the current luma transform block relative to the top-left luma sample of the current picture,
a variable nTbW specifying the transform block width,
a variable nTbH specifying the transform block height,
a variable predMode specifying the prediction mode of the coding unit,
a variable cIdx specifying the color component of the current block.

Output of this process is the (nTbW)×(nTbH) array d of scaled transform coefficients with elements d[x][y].

The quantization parameter qP is modified and the variables rectNonTsFlag and bdShift are derived as follows:
If transform_skip_flag[xTbY][yTbY][cIdx] is equal to 0, the following applies:

$$qP=qP-(cu\_act\_enabled\_flag[xTbY][yTbY]?5:0) \quad (1133)$$

$qP = Clip3( 0, 63, qP)$

$$rectNonTsFlag=(((Log\ 2(nTbW)+Log\ 2(nTbH))\&1)==1)?1:0 \quad (1134)$$

$$bdShift=BitDepth+rectNonTsFlag+((Log\ 2(nTbW)+Log\ 2(nTbH))/2)-5+pic\_dep\_quant\_enabled\_flag \quad (1135)$$

Otherwise (transform_skip_flag[xTbY][yTbY][cIdx] is equal to 1), the following applies:

$$qP=Max(QpPrimeTsMin,qP)-(cu\_act\_enabled\_flag[xTbY][yTbY]?5:0) \quad (1136)$$

$qP=Max(QpPrimeTsMin,qp-(cu\_act\_enabled\_flag[xTbY][yTbY] ? 5 : 0))$

$$rectNonTsFlag=0 \quad (1137)$$

$$bdShift=10 \quad (1138)$$

Figure 3:
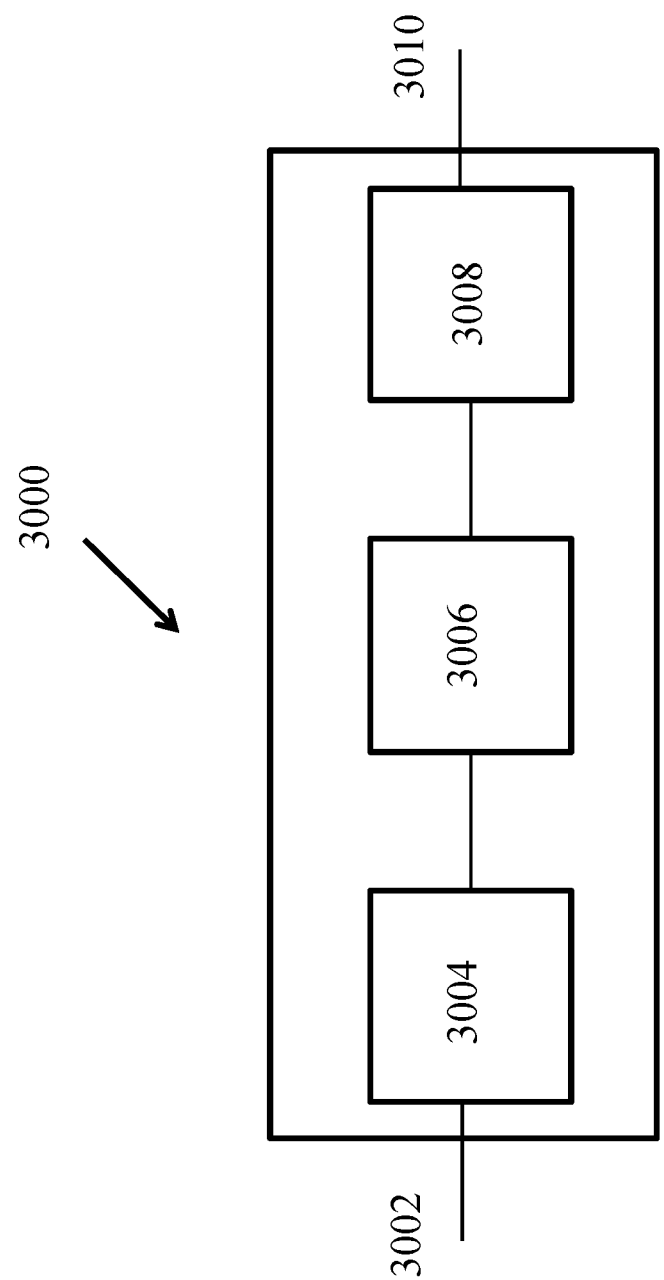
FIG. 3 is a block diagram showing an example video processing system in which various techniques disclosed herein may be implemented.

FIG. 3 is a block diagram showing an example video processing system 3000 in which various techniques disclosed herein may be implemented. Various implementations may include some or all of the components of the system 3000. The system 3000 may include input 3002 for receiving video content. The video content may be received in a raw or uncompressed format, e.g., 8 or 10 bit multi-component pixel values, or may be in a compressed or encoded format. The input 3002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 3000 may include a coding component 3004 that may implement the various coding or encoding methods described in the present document. The coding component 3004 may reduce the average bitrate of video from the input 3002 to the output of the coding component 3004 to produce a coded representation of the video. The coding techniques are therefore sometimes called video compression or video transcoding techniques. The output of the coding component 3004 may be either stored, or transmitted via a communication connected, as represented by the component 3006. The stored or communicated bitstream (or coded) representation of the video received at the input 3002 may be used by the component 3008 for generating pixel values or displayable video that is sent to a display interface 3010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 4:
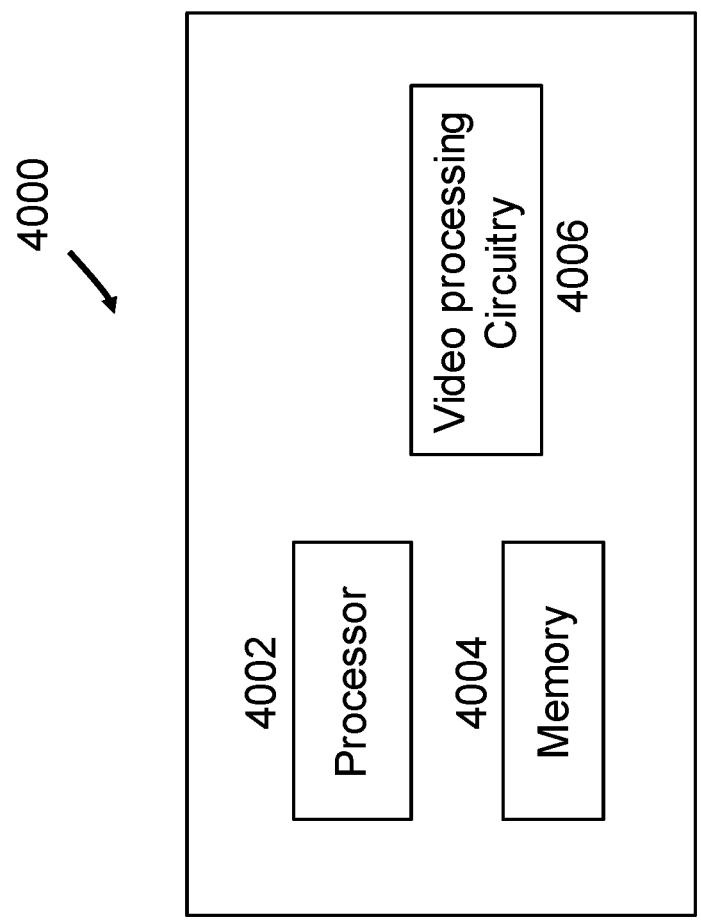
FIG. 4 is a block diagram of an example hardware platform used for video processing.

FIG. 4 is a block diagram of a video processing apparatus 4000. The apparatus 4000 may be used to implement one or more of the methods described herein. The apparatus 4000 may be embodied in a smartphone, tablet, computer, Internet of Things (IoT) receiver, and so on. The apparatus 4000 may include one or more processors 4002, one or more memories 4004 and video processing hardware 4006. The processor(s) 4002 may be configured to implement one or more methods described in the present document (e.g., in FIGS. 8-12). The memory (memories) 4004 may be used for storing data and code used for implementing the methods and techniques described herein. The video processing hardware 4006 may be used to implement, in hardware circuitry, some techniques described in the present document.

Figure 5:
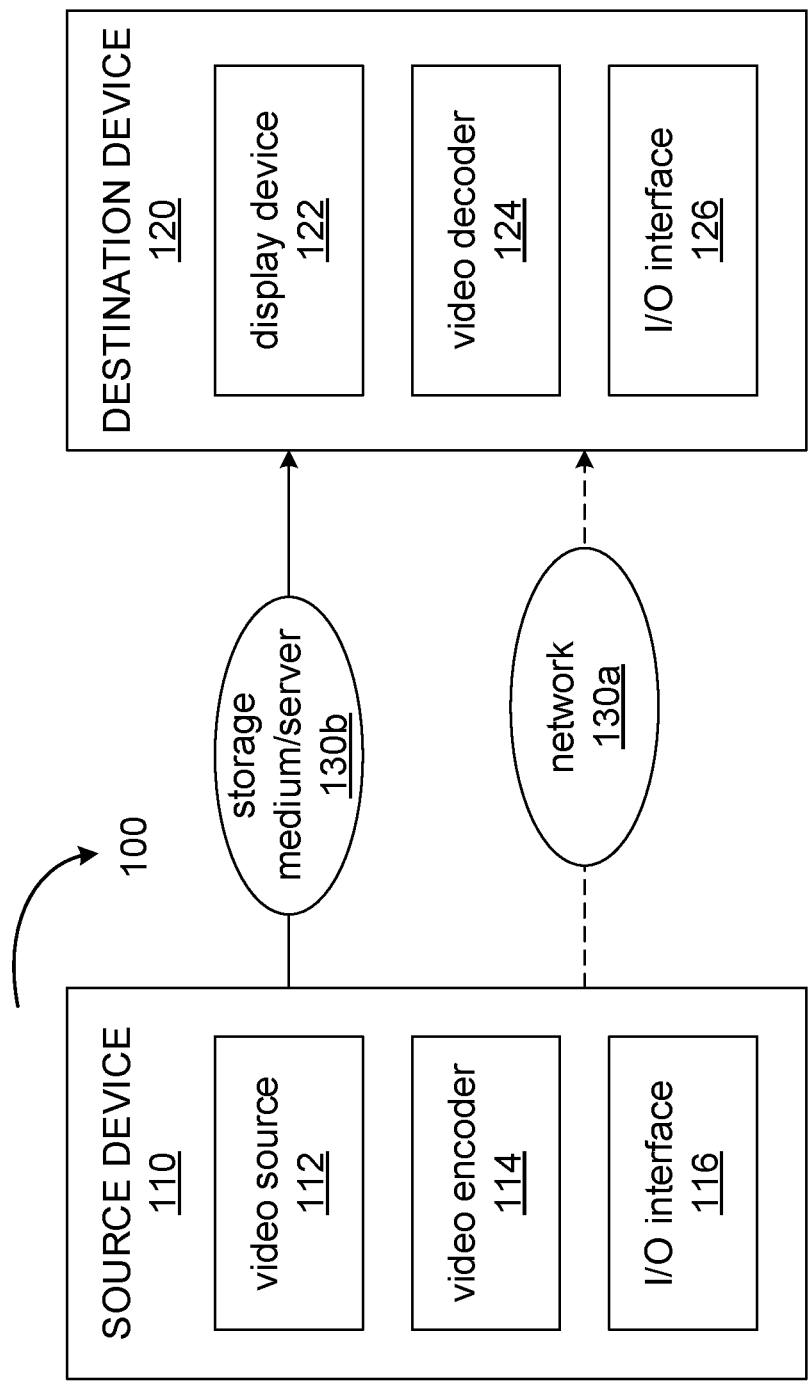
FIG. 5 is a block diagram that illustrates an example video coding system that can implement some embodiments of the present disclosure.

FIG. 5 is a block diagram that illustrates an example video coding system 100 that may utilize the techniques of this disclosure. As shown in FIG. 5, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources.

The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 6:
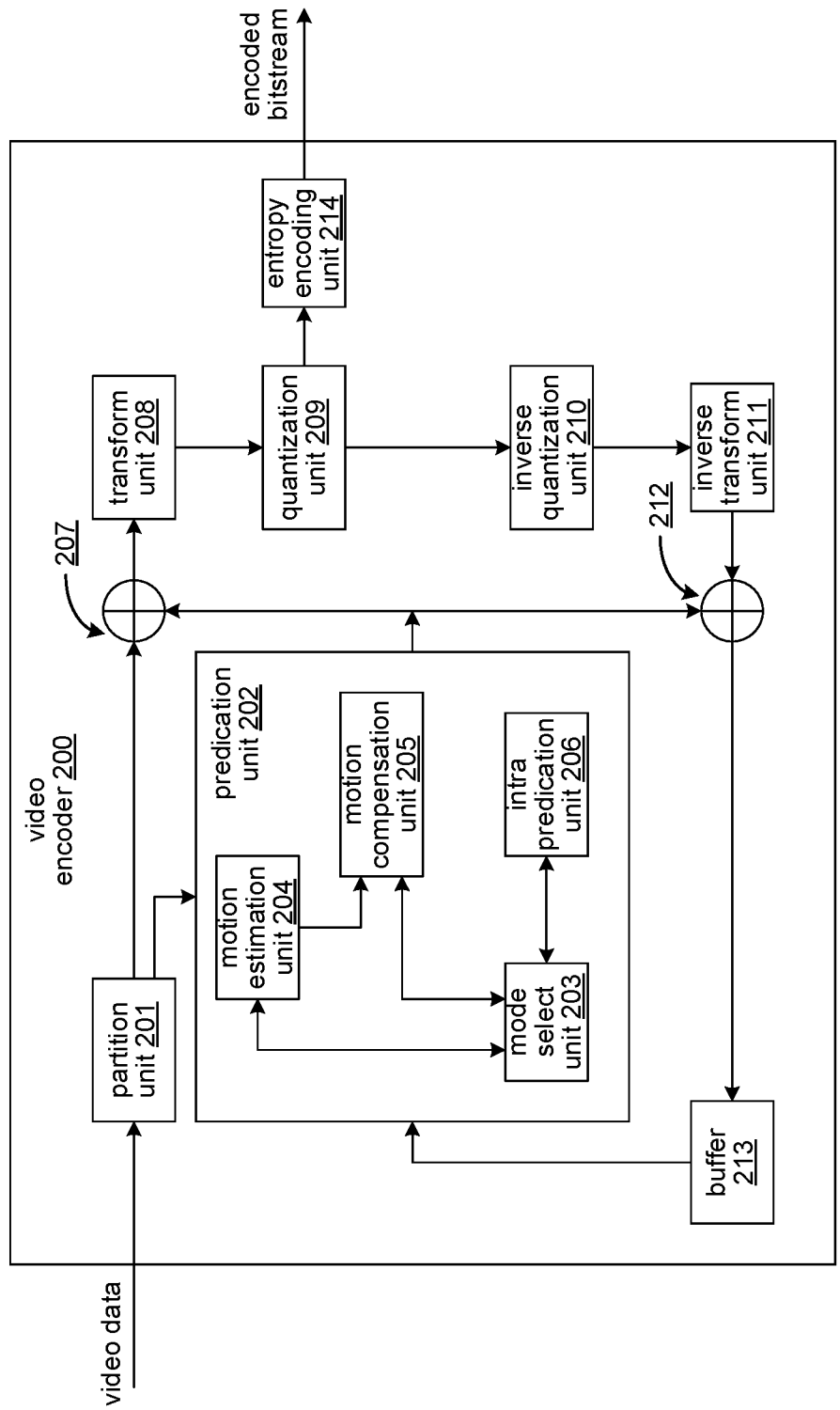
FIG. 6 is a block diagram that illustrates an example of an encoder that can implement some embodiments of the present disclosure.

FIG. 6 is a block diagram illustrating an example of video encoder 200, which may be video encoder 114 in the system 100 illustrated in FIG. 5.

Video encoder 200 may be configured to perform any or all of the techniques of this disclosure. In the example of FIG. 6, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 6 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 7:
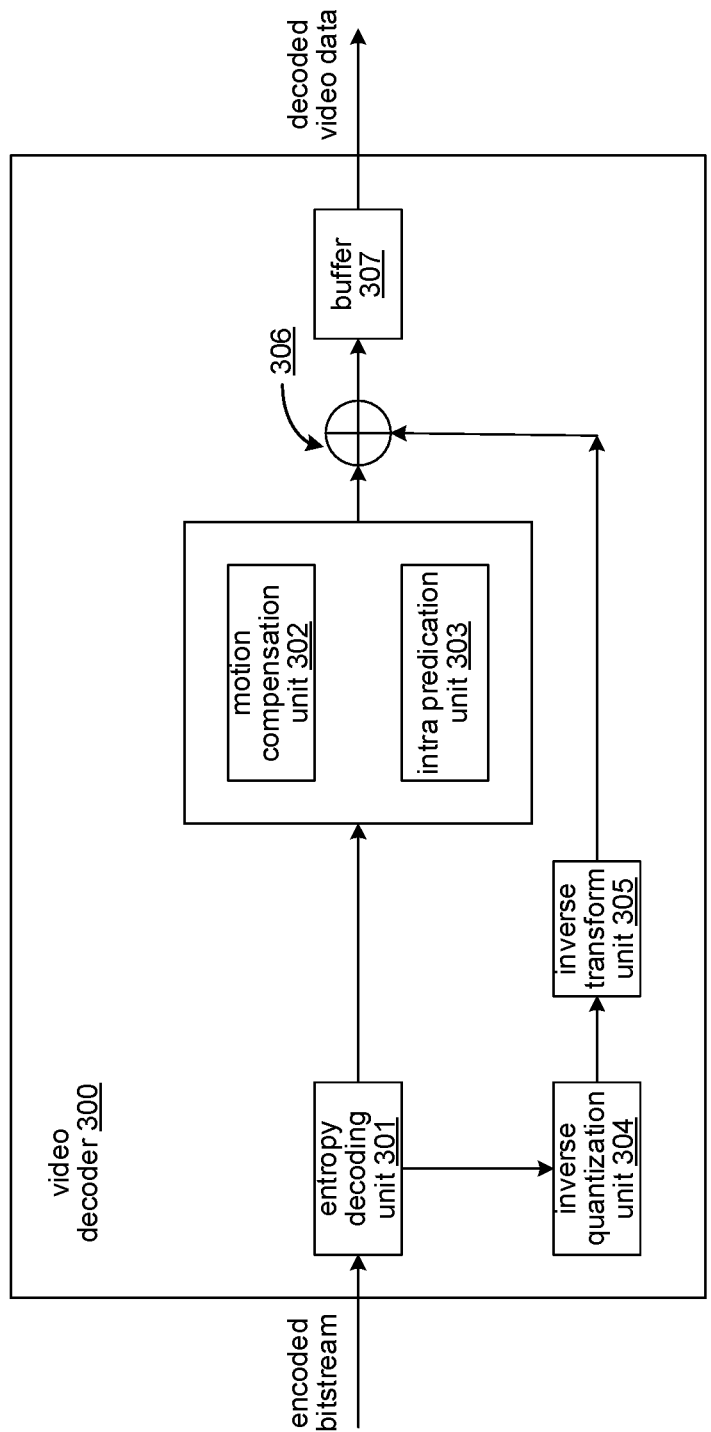
FIG. 7 is a block diagram that illustrates an example of a decoder that can implement some embodiments of the present disclosure.

FIG. 7 is a block diagram illustrating an example of video decoder 300 which may be video decoder 114 in the system 100 illustrated in FIG. 5.

The video decoder 300 may be configured to perform any or all of the techniques of this disclosure. In the example of FIG. 7, the video decoder 300 includes a plurality of functional components. The techniques described in this disclosure may be shared among the various components of the video decoder 300. In some examples, a processor may be configured to perform any or all of the techniques described in this disclosure.

In the example of FIG. 7, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 6).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

FIGS. 8-12 show example methods that can implement the technical solution described above in, for example, the embodiments shows in FIGS. 3-7.

Figure 8:
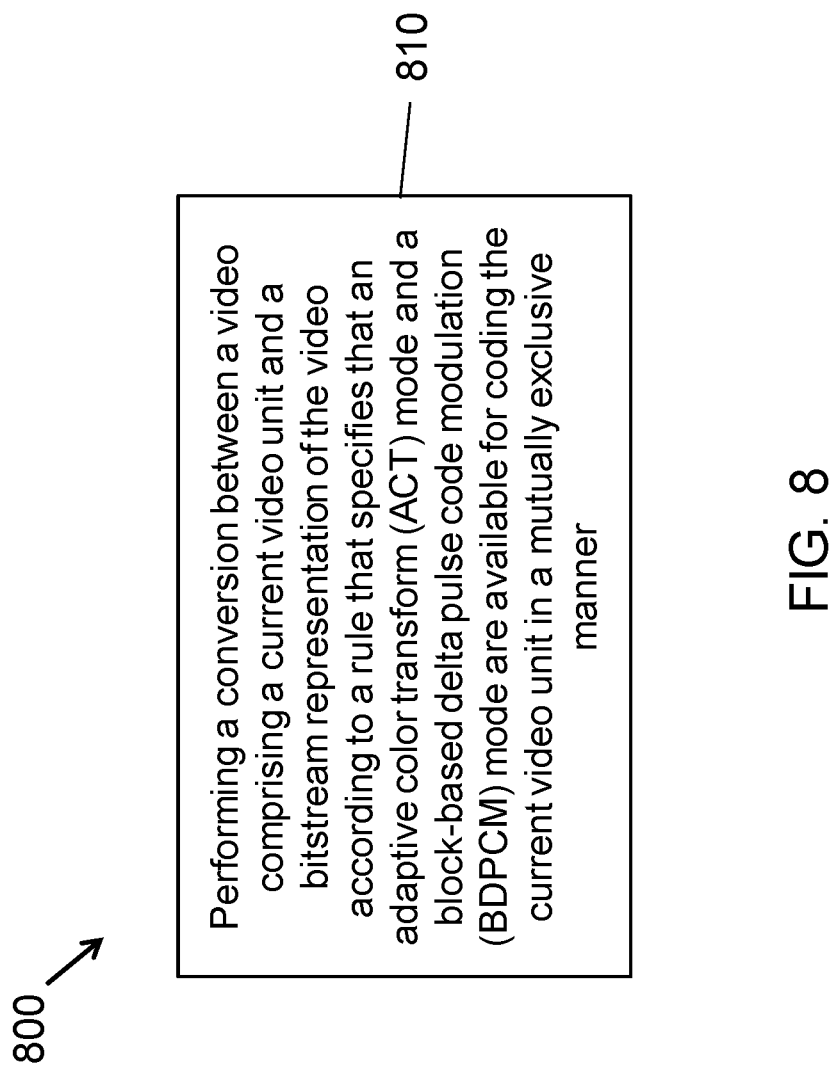
FIGS. 8-12 show flowcharts for example methods of video processing.

FIG. 8 shows a flowchart for an example method 800 of video processing. The method 800 includes, at operation 810, performing a conversion between a video comprising a current video unit and a bitstream representation of the video according to a rule that specifies that an adaptive color transform (ACT) mode and a block-based delta pulse code modulation (BDPCM) mode are available for coding the current video unit in a mutually exclusive manner.

Figure 9:
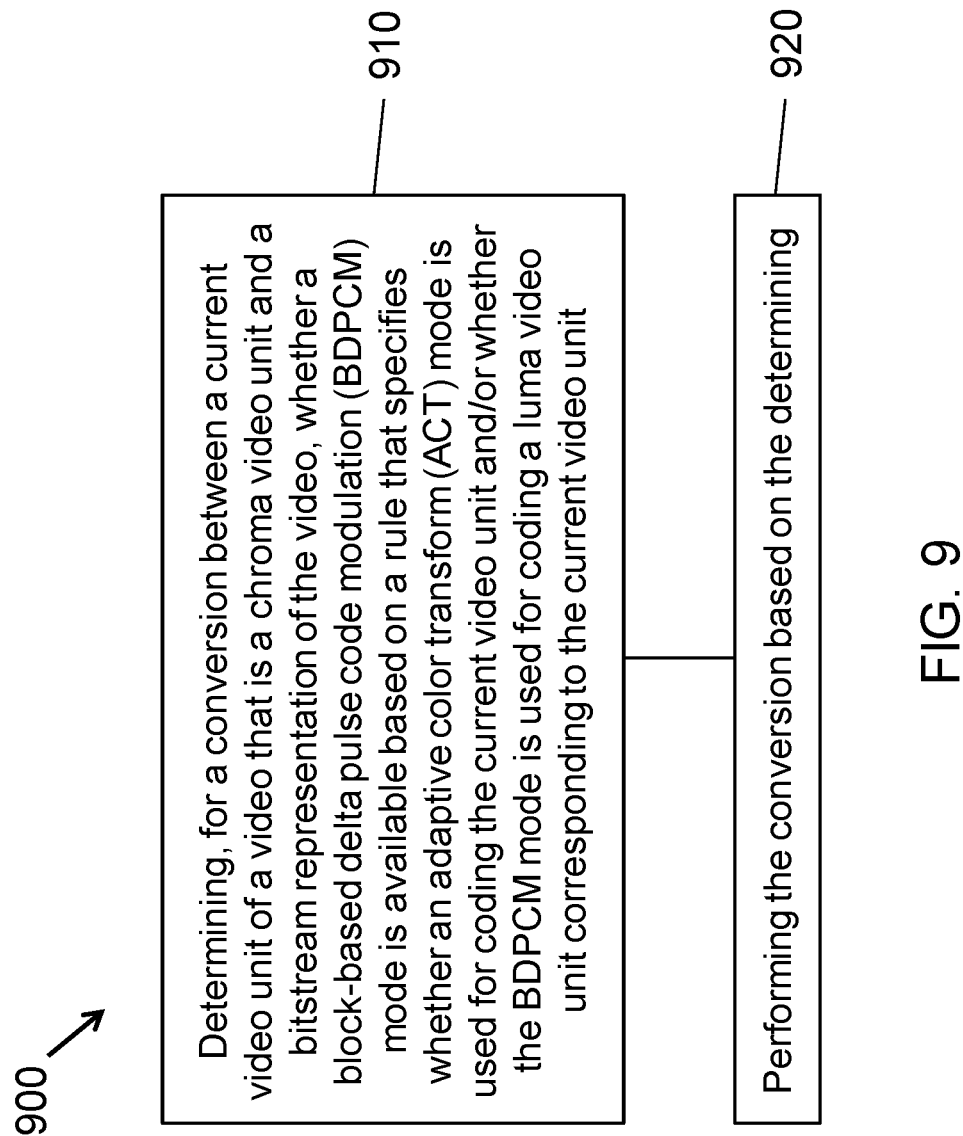

FIG. 9 shows a flowchart for an example method 900 of video processing. The method 900 includes, at operation 910, determining, for a conversion between a current video unit of a video that is a chroma video unit and a bitstream representation of the video, whether a block-based delta pulse code modulation (BDPCM) mode is available based on a rule that specifies whether an adaptive color transform (ACT) mode is used for coding the current video unit and/or whether the BDPCM mode is used for coding a luma video unit corresponding to the current video unit.

The method 900 includes, at operation 920, performing the conversion based on the determining.

Figure 10:
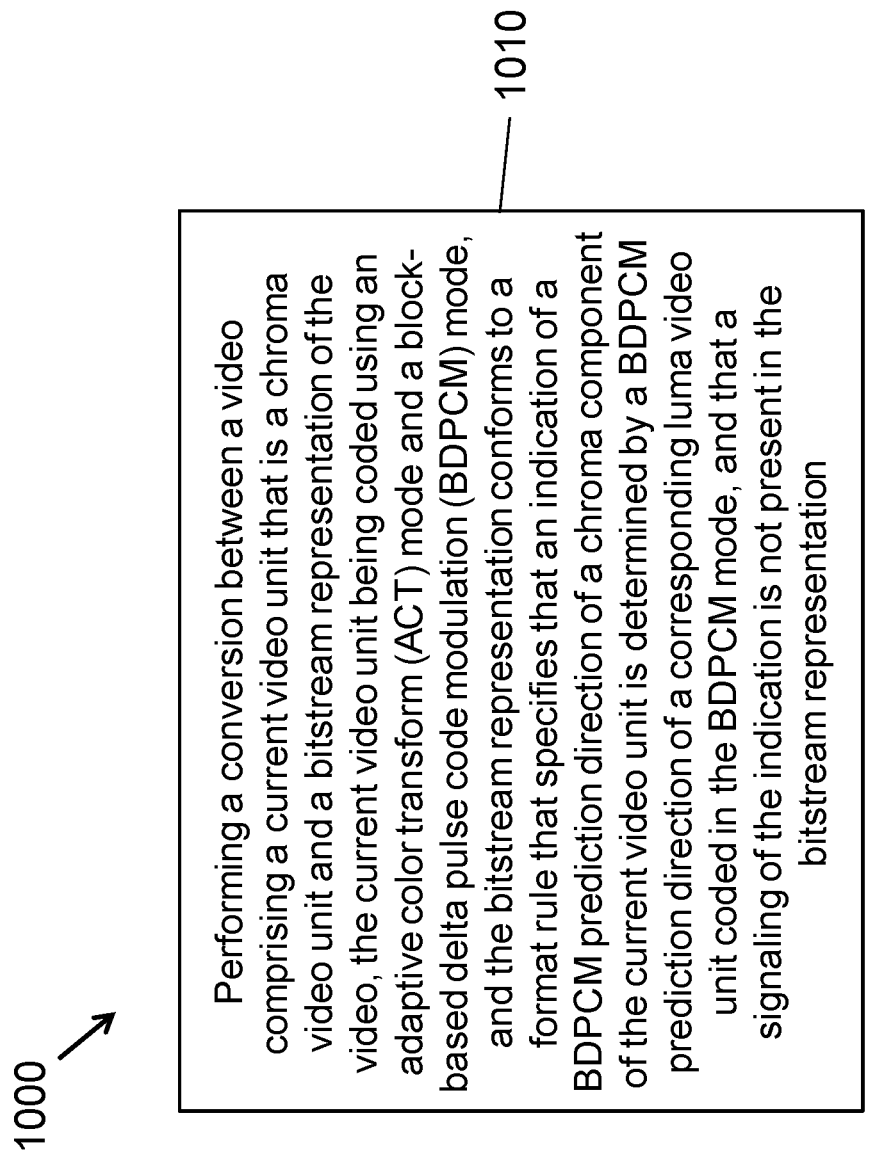

FIG. 10 shows a flowchart for an example method 1000 of video processing. The method 1000 includes, at operation 1010, performing a conversion between a video comprising a current video unit that is a chroma video unit and a bitstream representation of the video, the current video unit being coded using an adaptive color transform (ACT) mode and a block-based delta pulse code modulation (BDPCM) mode, and the bitstream representation conforms to a format rule that specifies that an indication of a BDPCM prediction direction of a chroma component of the current video unit is determined by a BDPCM prediction direction of a corresponding luma video unit coded in the BDPCM mode, and that a signaling of the indication is not present in the bitstream representation.

Figure 11:
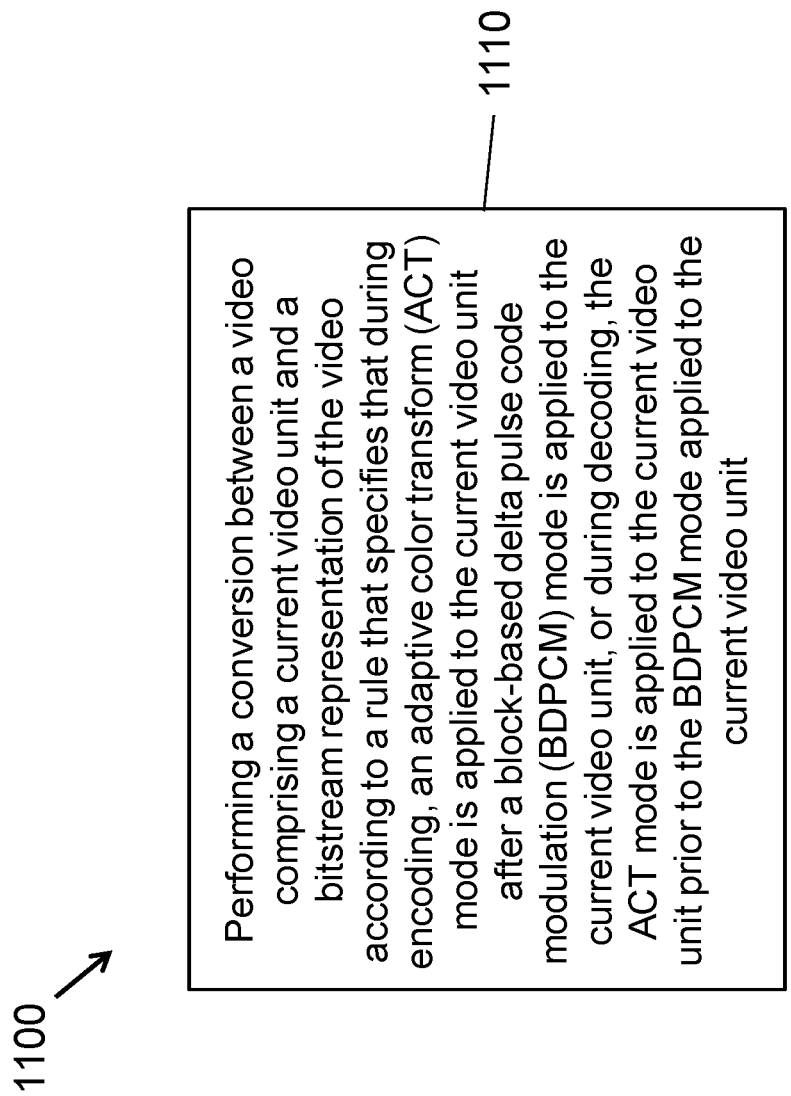

FIG. 11 shows a flowchart for an example method 1100 of video processing. The method 1100 includes, at operation 1110, performing a conversion between a video comprising a current video unit and a bitstream representation of the video according to a rule that specifies that during encoding, an adaptive color transform (ACT) mode is applied to the current video unit after a block-based delta pulse code modulation (BDPCM) mode is applied to the current video unit, or during decoding, the ACT mode is applied to the current video unit prior to the BDPCM mode applied to the current video unit.

Figure 12:
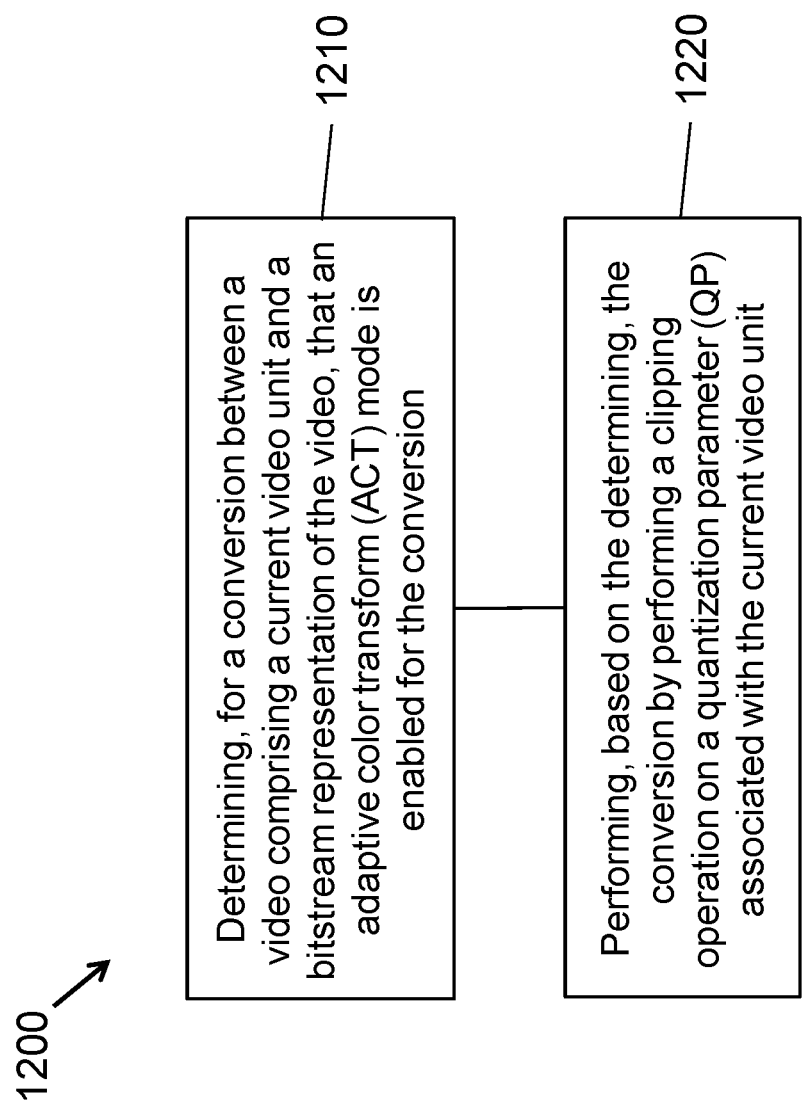

FIG. 12 shows a flowchart for an example method 1200 of video processing. The method 1200 includes, at operation 1210, determining, for a conversion between a video comprising a current video unit and a bitstream representation of the video, that an adaptive color transform (ACT) mode is enabled for the conversion.

The method 1200 includes, at operation 1220, performing, based on the determining, the conversion by performing a clipping operation on a quantization parameter (QP) associated with the current video unit.

A first listing of solutions preferred by some embodiments is provided next.

A1. A method of video processing, comprising performing a conversion between a video comprising a current video unit and a bitstream representation of the video according to a rule, wherein the rule specifies that an adaptive color transform (ACT) mode and a block-based delta pulse code modulation (BDPCM) mode are available for coding the current video unit in a mutually exclusive manner.

A2. The method of solution A1, wherein the ACT mode is enabled for the current video unit, and wherein the BDPCM mode is disabled for the current video unit.

A3. The method of solution A2, wherein, for a luma component of the video, an indication of usage for the BDPCM mode is signaled after an indication of usage for the ACT mode in the bitstream representation.

A4. The method of solution A2, wherein, for a chroma component of the video, an indication of usage for the BDPCM mode is excluded from the bitstream representation, and wherein the indication is inferred to be false.

A5. The method of solution A1, wherein the BDPCM mode is enabled for the current video unit, and wherein the ACT mode is disabled for the current video unit.

A6. The method of solution A5, wherein an indication of usage for the ACT mode is signaled after an indication of usage for the BDPCM mode in the bitstream representation.

A7. The method of solution A5, wherein an indication of usage for the ACT mode is excluded from the bitstream representation, and wherein the indication is inferred to be false.

A8. The method of any of solutions A5 to A7, wherein the BDPCM mode corresponds to a BDPCM mode for a luma component of the video.

A9. The method of any of solutions A5 to A7, wherein the BDPCM mode corresponds to a BDPCM mode for a chroma component of the video.

A10. A method of video processing, comprising determining, for a conversion between a current video unit of a video that is a chroma video unit and a bitstream representation of the video, whether a block-based delta pulse code modulation (BDPCM) mode is available based on a rule, and performing the conversion based on the determining, wherein the rule is based on whether an adaptive color transform (ACT) mode is used for coding the current video unit and/or whether the BDPCM mode is used for coding a luma video unit corresponding to the current video unit.

A11. The method of solution A10, wherein the ACT mode is enabled, and wherein a usage of the BDPCM mode for the chroma component is inferred to be identical to the usage of the BDPCM mode for the luma component.

A12. The method of solution A10, wherein an inclusion of an indication of the usage of the ACT mode in the bitstream representation is based on BDPCM prediction directions for the luma component and the chroma component.

A13. A method of video processing, comprising performing a conversion between a video comprising a current video unit that is a chroma video unit and a bitstream representation of the video, wherein the current video unit is coded using an adaptive color transform (ACT) mode and a block-based delta pulse code modulation (BDPCM) mode, wherein the bitstream representation conforms to a format rule, wherein the format rule specifies that an indication of a BDPCM prediction direction of a chroma component of the current video unit is determined by a BDPCM prediction direction of a corresponding luma video unit coded in the BDPCM mode, and wherein a signaling of the indication is not present in the bitstream representation.

A14. The method of solution A13, wherein the indication of the usage of the BDPCM prediction direction for the chroma component of the current video unit is inferred to be zero upon a determination that the ACT mode is enabled for the current video unit.

A15. A method of video processing, comprising performing a conversion between a video comprising a current video unit and a bitstream representation of the video according to a rule, wherein, the rule specifies that during encoding, an adaptive color transform (ACT) mode is applied to the current video unit after a block-based delta pulse code modulation (BDPCM) mode is applied to the current video unit, or during decoding, the ACT mode is applied to the current video unit prior to the BDPCM mode applied to the current video unit.

A16. The method of solution A15, wherein a first prediction mode of the BDPCM mode for a chroma component of the video coding unit is different from a second prediction mode of the BDPCM mode for a luma component of the video.

A17. The method of any of solutions A1 to A16, wherein the video unit comprises a coding unit (CU), a prediction unit (PU), or a transform unit (TU).

A18. The method of any of solutions A1 to A17, wherein the conversion comprises decoding the video from the bitstream representation.

A19. The method of any of solutions A1 to A17, wherein the conversion comprises encoding the video into the bitstream representation.

A20. A video processing apparatus comprising a processor configured to implement a method recited in any one or more of solutions A1 to A19.

A21. A computer-readable medium having instructions stored thereon, the instructions, when executed, causing a processor to implement a method recited in any one or more of solutions A1 to A19.

A22. A computer readable medium that stores the bitstream representation generated according to any of solutions A1 to A19.

A23. A video processing apparatus for storing a bitstream representation, wherein the video processing apparatus is configured to implement a method recited in any one or more of solutions A1 to A19.

A second listing of solutions preferred by some embodiments is provided next.

B1. A method of video processing, comprising determining, for a conversion between a video comprising a current video unit and a bitstream representation of the video, that an adaptive color transform (ACT) mode is enabled for the conversion, and performing, based on the determining, the conversion by performing a clipping operation on a quantization parameter (QP) associated with the current video unit.

B2. The method of solution B1, wherein the clipping operation uses a clipping function defined as $$\text{clip}(l, h, x) = \begin{cases} l & \text{if } x \leq l \\ x & \text{if } l < x < h, \\ h & \text{if } x \geq h \end{cases}$$

wherein x is an input argument, l is a minimum output value of the clipping function, and h is a maximum output value of the clipping function, and wherein l, h, and x are integers.

B3. The method of solution B2, wherein l=0.

B4. The method of solution B2, wherein h=63.

B5. The method of solution B2, wherein l is equal to a minimal allowed QP for a transform skip mode based on the current video unit being coded using the transform skip mode.

B6. The method of solution B1, wherein the clipping operation is performed subsequent to a QP adjustment operation for the ACT mode.

B7. The method of any of solutions B2 to B5, wherein l and h are based on at least one of (a) a message signaled in a decoder parameter set (DPS), a sequence parameter set (SPS), a video parameter set (VPS), a picture parameter set (PPS), an adaptation parameter set (APS), a picture header, a slice header, a tile group header, a largest coding unit (LCU), a coding unit (CU), an LCU row, a group of LCUs, a transform unit (TU), a prediction unit (PU) block, or a video coding unit, (b) a position of the CU, a PU, the TU, a block, or the video coding unit, (c) a coded mode of one or more blocks that comprise at least one sample along an edge, (d) one or more transform matrices applied to the one or more blocks, (e) a dimension or a shape of the current video unit and/or a neighboring video unit, (f) an indication of a color format, (g) a coding tree structure, (h) a slice type, a tile group type, and/or a picture type, (i) a color component of the video, (j) a temporal layer identification (ID), and (k) a profile, level, or tier of a standard.

B8. The method of any of solutions B1 to B7, wherein performing the clipping operation is further based on a color format of the video being 420 or 444.

B9. The method of any of solutions B1 to B7, wherein performing the clipping operation is further based on an indication of a usage of the clipping operation being signaled in a sequence parameter set (SPS), a picture parameter set (PPS), a picture header, or a slice header.

B10. The method of any of solutions B1 to B7, wherein performing the clipping operation is further based on at least one of (a) video contents, (b) a message signaled in a decoder parameter set (DPS), a sequence parameter set (SPS), a video parameter set (VPS), a picture parameter set (PPS), an adaptation parameter set (APS), a picture header, a slice header, a tile group header, a largest coding unit (LCU), a coding unit (CU), an LCU row, a group of LCUs, a transform unit (TU), a prediction unit (PU) block, or a video coding unit, (c) a position of the CU, a PU, the TU, a block, or the video coding unit, (d) a coded mode of one or more blocks that comprise at least one sample along an edge, (e) one or more transform matrices applied to the one or more blocks, (f) a dimension or a shape of the current video unit and/or a neighboring video unit, (g) an indication of a color format, (h) a coding tree structure, (i) a slice type, a tile group type, and/or a picture type, (j) a color component of the video, (k) a temporal layer identification (ID), and (l) a profile, level, or tier of a standard.

B11. The method of any of solutions B1 to B10, wherein the video unit comprises a coding unit (CU), a prediction unit (PU), or a transform unit (TU).

B12. The method of any of solutions B1 to B11, wherein the conversion comprises decoding the video from the bitstream representation.

B13. The method of any of solutions B1 to B11, wherein the conversion comprises encoding the video into the bitstream representation.

B14. A video processing apparatus comprising a processor configured to implement a method recited in any one or more of solutions B1 to B13.

B15. A computer-readable medium having instructions stored thereon, the instructions, when executed, causing a processor to implement a method recited in any one or more of solutions B1 to B13.

B16. A computer readable medium that stores the bitstream representation generated according to any of solutions B1 to B13.

B17. A video processing apparatus for storing a bitstream representation, wherein the video processing apparatus is configured to implement a method recited in any one or more of solutions B1 to B13.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
performing a conversion between a video comprising a current video unit and a bitstream of the video according to a rule,
wherein the rule specifies that when an adaptive color transform mode and a transform skip mode are enabled for the current video unit and the current video unit is a luma component unit, an input quantization parameter is added to an adaptive color transform offset value equal to −5, and when the input quantization parameter added to −5 is less than a minimal allowed quantization parameter for the transform skip mode, a quantization parameter, which is used in a quantization process or an inverse quantization process, is set equal to the minimal allowed quantization parameter, wherein the rule specifies that when the adaptive color transform mode is enabled for the current video unit and the transform skip mode is not applied to the current video unit and the current video unit is the luma component unit, the input quantization parameter is added to the adaptive color transform offset value equal to −5, and when the input quantization parameter added to −5 is less than 0, the quantization parameter, which is used in the quantization process or the inverse quantization process, is set equal to 0, wherein, in the adaptive color transform mode, for an encoding operation, visual signals are converted from a first color domain to a second color domain, or for a decoding operation, the visual signals are converted from the second color domain to the first color domain.

2. The method of claim 1, wherein the rule further specifies that when the current video unit is a chroma component unit, in response to the adaptive color transform mode being enabled for the current video unit, an indication of usage of a differential coding mode for the current video unit is excluded from the bitstream, and wherein the indication of the differential coding mode for the current video unit is inferred to be false which indicates that the differential coding mode is disabled for the current video unit, wherein in the differential coding mode, residuals of samples of the current video unit are represented in the bitstream using differences between quantized residuals and predictors of the quantized residuals.

3. The method of claim 2, wherein the differences are represented using a block based differential pulse coding modulation representation.

4. The method of claim 1, wherein the conversion comprises decoding the video from the bitstream.

5. The method of claim 1, wherein the conversion comprises encoding the video into the bitstream.

6. An apparatus for processing video data comprising a processor and a non-transitory memory with instructions thereon, wherein the instructions upon execution by the processor, cause the processor to:

perform a conversion between a video comprising a current video unit and a bitstream of the video according to a rule, wherein the rule specifies that when an adaptive color transform mode and a transform skip mode are enabled for the current video unit and the current video unit is a luma component unit, an input quantization parameter is added to an adaptive color transform offset value equal to −5, and when the input quantization parameter added to −5 is less than a minimal allowed quantization parameter for the transform skip mode, a quantization parameter, which is used in a quantization process or an inverse quantization process, is set equal to the minimal allowed quantization parameter, wherein the rule specifies that when the adaptive color transform mode is enabled for the current video unit and the transform skip mode is not applied to the current video unit and the current video unit is the luma component unit, the input quantization parameter is added to the adaptive color transform offset value equal to −5, and when the input quantization parameter added to −5 is less than 0, the quantization parameter, which is used in the quantization process or the inverse quantization process, is set equal to 0, wherein, in the adaptive color transform mode, for an encoding operation, visual signals are converted from a first color domain to a second color domain, or for a decoding operation, the visual signals are converted from the second color domain to the first color domain.

7. The apparatus of claim 6, wherein the rule further specifies that when the current video unit is a chroma component unit, in response to the adaptive color transform mode being enabled for the current video unit, an indication of usage of a differential coding mode for the current video unit is excluded from the bitstream, and wherein the indication of the differential coding mode for the current video unit is inferred to be false which indicates that the differential coding mode is disabled for the current video unit, wherein in the differential coding mode, residuals of samples of the current video unit are represented in the bitstream using differences between quantized residuals and predictors of the quantized residuals.

8. The apparatus of claim 7, wherein the differences are represented using a block based differential pulse coding modulation representation.

9. A non-transitory computer-readable storage medium storing instructions that cause a processor to:

perform a conversion between a video comprising a current video unit and a bitstream of the video according to a rule, wherein the rule specifies that when an adaptive color transform mode and a transform skip mode are enabled for the current video unit and the current video unit is a luma component unit, an input quantization parameter is added to an adaptive color transform offset value equal to −5, and when the input quantization parameter added to −5 is less than a minimal allowed quantization parameter for the transform skip mode, a quantization parameter, which is used in a quantization process or an inverse quantization process, is set equal to the minimal allowed quantization parameter, wherein the rule specifies that when the adaptive color transform mode is enabled for the current video unit and the transform skip mode is not applied to the current video unit and the current video unit is the luma component unit, the input quantization parameter is added to the adaptive color transform offset value equal to −5, and when the input quantization parameter added to −5 is less than 0, the quantization parameter, which is used in the quantization process or the inverse quantization process, is set equal to 0, wherein, in the adaptive color transform mode, for an encoding operation, visual signals are converted from a first color domain to a second color domain, or for a decoding operation, the visual signals are converted from the second color domain to the first color domain.

10. The non-transitory computer-readable storage medium of claim 9, wherein the rule further specifies that when the current video unit is a chroma component unit, in response to the adaptive color transform mode being enabled for the current video unit, an indication of usage of a differential coding mode for the current video unit is excluded from the bitstream, and wherein the indication of the differential coding mode for the current video unit is inferred to be false which indicates that the differential coding mode is disabled for the current video unit, wherein, in the differential coding mode, residuals of samples of the current video unit are represented in the bitstream using differences between quantized residuals and predictors of the quantized residuals.

11. A non-transitory computer-readable recording medium storing a bitstream of a video which is generated by a method performed by a video processing apparatus, wherein the method comprises:

generating the bitstream for a video comprising a current video unit according to a rule, wherein the rule specifies that when an adaptive color transform mode and a transform skip mode are enabled for the current video unit and the current video unit is a luma component unit, an input quantization parameter is added to an adaptive color transform offset value equal to −5, and when the input quantization parameter added to −5 is less than a minimal allowed quantization parameter for the transform skip mode, a quantization parameter, which is used in a quantization process or an inverse quantization process, is set equal to the minimal allowed quantization parameter, wherein the rule specifies that when the adaptive color transform mode is enabled for the current video unit and the transform skip mode is not applied to the current video unit and the current video unit is the luma component unit, the input quantization parameter is added to the adaptive color transform offset value equal to −5, and when the input quantization parameter added to −5 is less than 0, the quantization parameter, which is used in the quantization process or the inverse quantization process, is set equal to 0, wherein, in the adaptive color transform mode, for an encoding operation, visual signals are converted from a first color domain to a second color domain, or for a decoding operation, the visual signals are converted from the second color domain to the first color domain.

12. The non-transitory computer-readable recording medium of claim 11, wherein the rule further specifies that when the current video unit is a chroma component unit, in response to the adaptive color transform mode being enabled for the current video unit, an indication of usage of a differential coding mode for the current video unit is excluded from the bitstream, and wherein the indication of the differential coding mode for the current video unit is inferred to be false which indicates that the differential coding mode is disabled for the current video unit, wherein, in the differential coding mode, residuals of samples of the current video unit are represented in the bitstream using differences between quantized residuals and predictors of the quantized residuals.

13. The method of claim 2, wherein the rule further specifies that the indication of usage of the differential coding mode for the current video unit is signaled after an indication of usage of the adaptive color transform mode for the current video unit in the bitstream.

14. The non-transitory computer-readable storage medium of claim 10, wherein the differences are represented using a block based differential pulse coding modulation representation.

15. The non-transitory computer-readable recording medium of claim 12, wherein the differences are represented using a block based differential pulse coding modulation representation.

* * * * *